(12) United States Patent
Nagata

(10) Patent No.: US 12,008,094 B2
(45) Date of Patent: Jun. 11, 2024

(54) CONTROL SYSTEM AND CONTROL METHOD

(71) Applicant: OMRON Corporation, Kyoto (JP)

(72) Inventor: Yuta Nagata, Kusatsu (JP)

(73) Assignee: OMRON Corporation, Kyoto (JP)

( * ) Notice: Subject to any disclaimer, the term of this patent is extended or adjusted under 35 U.S.C. 154(b) by 120 days.

(21) Appl. No.: 17/438,464

(22) PCT Filed: Feb. 18, 2020

(86) PCT No.: PCT/JP2020/006273
§ 371 (c)(1),
(2) Date: Sep. 12, 2021

(87) PCT Pub. No.: WO2020/195350
PCT Pub. Date: Oct. 1, 2020

(65) Prior Publication Data
US 2022/0129533 A1    Apr. 28, 2022

(30) Foreign Application Priority Data
Mar. 27, 2019   (JP) .................................. 2019-061206

(51) Int. Cl.
*H04L 9/08*        (2006.01)
*G06F 21/33*       (2013.01)
(Continued)

(52) U.S. Cl.
CPC .............. *G06F 21/33* (2013.01); *G06F 21/41* (2013.01); *H04L 9/0863* (2013.01); *H04L 9/3213* (2013.01)

(58) Field of Classification Search
CPC ... H04L 63/0846; H04L 63/10; H04L 9/0863; H04L 9/3213; G06F 21/33; G06F 21/41; G06F 21/604
See application file for complete search history.

(56) References Cited

U.S. PATENT DOCUMENTS 6,055,637 A      4/2000  Hudson et al.
8,875,282 B2 *  10/2014  Sinclair ..................... H04L 9/32
                                                          726/19
(Continued)

FOREIGN PATENT DOCUMENTS

CN    101321063     12/2008
CN    103716483      4/2014
(Continued)

OTHER PUBLICATIONS

"International Search Report (Form PCT/ISA/210) of PCT/JP2020/006273", mailed on Jun. 9, 2020, with English translation thereof, pp. 1-4.
(Continued)

*Primary Examiner* — Mohammad A Siddiqi
(74) *Attorney, Agent, or Firm* — JCIPRNET

(57) ABSTRACT

A technique for managing, in a centralized manner, user accounts in a control system which includes two or more units is provided. A control system (2) is provided with first and second units (200, 300). The first unit (200), upon reception of an access request to the first unit (200) from an external device (500), requests the external device (500) to input a user account, and transmits the user account received from the external device (500) to the second unit (300). The second unit (300, U3) refers to registration information (330) defining account information of registered users, and, when the user account is determined to be registered, transmits to the first unit (200) a token indicating permission of access. The first unit (200) transmits the token received from the second unit (300) to the external device (500).

5 Claims, 20 Drawing Sheets

(51) Int. Cl.
*G06F 21/41* (2013.01)
*H04L 9/32* (2006.01)

(56) References Cited

U.S. PATENT DOCUMENTS

| | | | | |
|---|---|---|---|---|
| 10,021,168 | B2* | 7/2018 | Hitomi | H04W 4/18 |
| 11,038,869 | B1* | 6/2021 | Natarajan | H04L 63/0876 |
| 2005/0120211 | A1* | 6/2005 | Yokoyama | G06F 21/335 |
| | | | | 713/168 |
| 2013/0125134 | A1* | 5/2013 | Ota | G06F 21/608 |
| | | | | 718/106 |
| 2013/0191928 | A1* | 7/2013 | Yin | G06F 21/10 |
| | | | | 726/27 |
| 2014/0101725 | A1 | 4/2014 | Shinoda | |
| 2014/0129153 | A1 | 5/2014 | Uratani | |
| 2015/0193600 | A1* | 7/2015 | Matsuda | G06F 21/10 |
| | | | | 726/9 |
| 2018/0253268 | A1* | 9/2018 | Tonegawa | G06F 3/1238 |
| 2018/0278603 | A1* | 9/2018 | Yabe | H04L 63/0892 |
| 2020/0389791 | A1* | 12/2020 | Takemori | H04L 9/08 |

FOREIGN PATENT DOCUMENTS

| | | |
|---|---|---|
| CN | 104580134 | 4/2015 |
| JP | 2009217803 | 9/2009 |
| JP | 2014075084 | 4/2014 |
| JP | 2016103750 | 6/2016 |
| JP | 2016194808 | 11/2016 |
| JP | 2018024181 | 2/2018 |
| WO | 2014068632 | 5/2014 |

OTHER PUBLICATIONS

'Written Opinion of The International Searching Authourity (Form/ISA/237) of PCT/JP2020/006273', mailed on Jun. 9, 2020, with English translation thereof, pp. 1-8.
"Search Report of Europe Counterpart Application", issued on Nov. 21, 2022, p. 1-p. 9.
"Office Action of China Counterpart Application", issued on Feb. 2, 2024, with English translation thereof, pp. 1-15.

* cited by examiner (S10)

ProxyInfo

```
<proxy enable="true">
 <info
     domain="AI"
     unit="#2"
 />
</proxy>
```

(S20)

ProxyInfo

```
<proxy enable="true">
 <info
     domain="SGU"
     unit="#3"
     SSO="Master"
 />
</proxy>
```

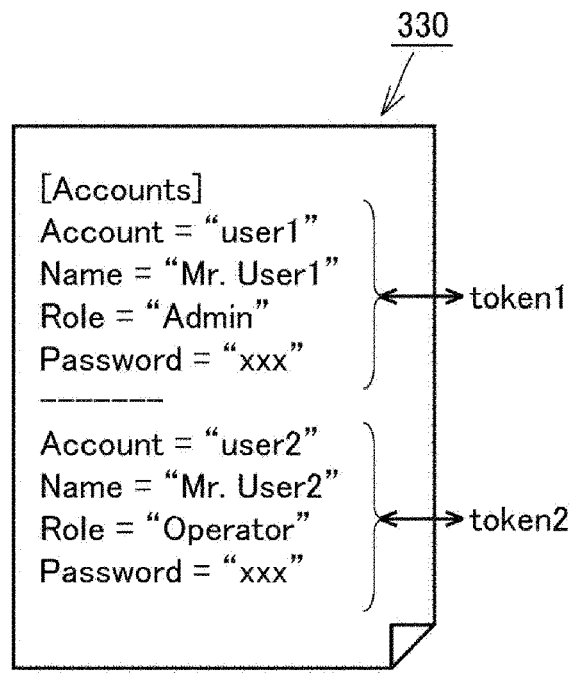
FIG. 14
(S50)
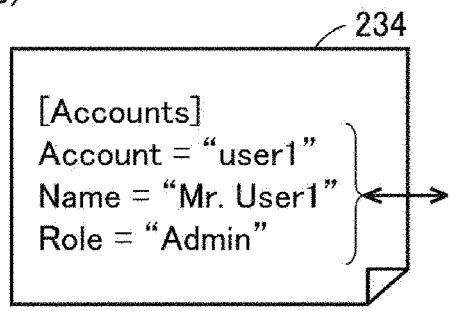
FIG. 15
(S52)
LinkInfo
```
<html>
  <a href="http://192.168.250.2/u3/App31/index.php > ──31
     Database information ──32
  </a>
</html>
```
FIG. 16

CONTROL SYSTEM AND CONTROL METHOD

CROSS-REFERENCE TO RELATED APPLICATION

This application is a 371 application of the International PCT application serial no. PCT/JP2020/006273, filed on Feb. 18, 2020, which claims the priority benefits of Japan Patent Application No. 2019-061206, filed on Mar. 27, 2019. The entirety of each of the above-mentioned patent applications is hereby incorporated by reference herein and made a part of this specification.

TECHNICAL FIELD

The present disclosure relates to a technology for simplifying login processing in a control system which comprises a plurality of units.

BACKGROUND ART

At production sites and the like using factory automation (FA), a control unit such as a programmable logic controller (PLC) is used for controlling various facilities and various devices disposed in each facility. Recently, a control unit which can be connected to an external device has come into wide use. Regarding such a control unit, Patent Literature 1 (Japanese Patent Laid-Open No. 2016-194808) discloses a PLC which can access a database of an external device.

CITATION LIST

Patent Literature

[Patent Literature 1]
Japanese Patent Laid-Open No. 2016-194808

SUMMARY OF INVENTION

Technical Problem

Various functional units can be connected to a control unit. Diverse applications can be installed in each functional unit. As necessary, a user can add a functional unit.

In order to ensure security, every time a user accesses a different functional unit, each functional unit requires an input of an account of a user. It would be troublesome for a user if an input of an account were required every time he/she accesses a different functional unit. In addition, if there are a number of accounts to be managed, a user may repeatedly use the same account or set a simple password therefor. For this reason, on the contrary, there is a probability that a security level will be degraded. Therefore, a technology for centrally managing user accounts in a control system which comprises a plurality of units is desired.

Solution to Problem

An example of the present disclosure provides a control system which comprises a plurality of units. The plurality of units includes a first unit, and a second unit which is able to communicate with the first unit. The first unit requests an input of a user account to an external device constituted to be able to communicate with the first unit upon reception of a request for access to the first unit from the external device and transmits the user account to the second unit upon reception of the user account from the external device. The second unit refers to registration information defining account information of registered users, determines whether or not the user account received by the second unit has been registered, and transmits a token indicating permission of access to the first unit when it is determined that the user account received by the second unit has been registered. The first unit transmits the token received from the second unit to the external device.

According to the present disclosure, it is no longer necessary for a user to perform login processing for each of the units constituting the control system. In addition, since the number of user accounts to be managed by a user can be reduced, troublesomeness in management of user accounts can be eliminated. As a result, a probability of leakage of user accounts to the outside is reduced, and thus the security level of the control system is improved.

In the example of the present disclosure, the plurality of units further includes a third unit. The third unit permits access to the third unit when the token is received from the external device together with a request for access to the third unit.

According to the present disclosure, in the control system, a token issued for the first unit can also be diverted for the third unit. Accordingly, it is no longer necessary for a user to perform login processing for each of the units constituting the control system.

In the example of the present disclosure, the third unit is constituted to be able to communicate with the first unit. The first unit relays communication between the second unit and the external device and relays communication between the third unit and the external device.

According to the present disclosure, since the first unit relays communication between the second and third units and the external device, each of the units inside a control system 2 can be concealed from the outside. Accordingly, direct communication between each of the units inside the control system 2 and the external device is prevented, and thus a risk of security accompanying communication is reduced.

In the example of the present disclosure, an access authority is associated with each user account defined in the account information. The second unit refers to the account information upon reception of the user account from the external device, identifies the access authority associated with the user account, and further transmits the identified access authority to the first unit when the token is transmitted to the first unit. The first unit transmits information according to the access authority received from the second unit to the external device.

According to the present disclosure, in the control system, information provided to a user can be changed in accordance with the access authority applied to the user. Accordingly, in the control system, appropriate information according to the access authority can be provided to a user.

In the example of the present disclosure, an operation mode of the control system includes a maintenance mode indicating that the control system is under maintenance. The first unit or the second unit rewrites the access authority of a kind set in advance as an access authority of another kind set in advance when the operation mode of the control system is the maintenance mode.

According to the present disclosure, in the control system, when the operation mode of the control system is the maintenance mode, the access authority can be suitably switched. Accordingly, in the control system, appropriate information according to the access authority applied at the time of being in the maintenance mode can be provided to a user.

In the example of the present disclosure, the first unit or the second unit restores the access authority which has been rewritten as an access authority of another kind set in advance to the access authority before being rewritten when a condition which is set in advance and indicates that maintenance of the control system has ended is satisfied.

According to the present disclosure, in the control system, when maintenance ends, a rewritten access authority can be automatically restored.

Another example of the present disclosure provides a control method for a control system which comprises a plurality of units. The plurality of units includes a first unit, and a second unit which is able to communicate with the first unit. The control method includes a step of the first unit requesting an input of a user account to an external device constituted to be able to communicate with the first unit upon reception of a request for access to the first unit from the external device and transmitting the user account to the second unit upon reception of the user account from the external device; a step of the second unit referring to registration information defining account information of registered users, determining whether or not the user account received by the second unit has been registered, and transmitting a token indicating permission of access to the first unit when it is determined that the user account received by the second unit has been registered; and a step of the first unit transmitting the token received from the second unit to the external device.

According to the present disclosure, it is no longer necessary for a user to perform login processing for each of the units constituting the control system. In addition, since the number of user accounts to be managed by a user can be reduced, troublesomeness in management of user accounts can be eliminated. As a result, a probability of leakage of user accounts to the outside is reduced, and thus the security level of the control system is improved.

BRIEF DESCRIPTION OF DRAWINGS

FIG. 14 is a view illustrating an example of a data structure of registration information.

FIG. 15 is a view illustrating account information stored in Step S50 of FIG. 11.

FIG. 16 is a view illustrating link information generated in Step S52 of FIG. 11.

DESCRIPTION OF EMBODIMENT

Hereinafter, each embodiment according to the present invention will be described with reference to the drawings. In the following description, the same reference signs are applied to the same components and constituent elements. The same applies to the names and the functions thereof. Therefore, detailed description thereof will not be repeated.

A. Application Example

Figure 1:
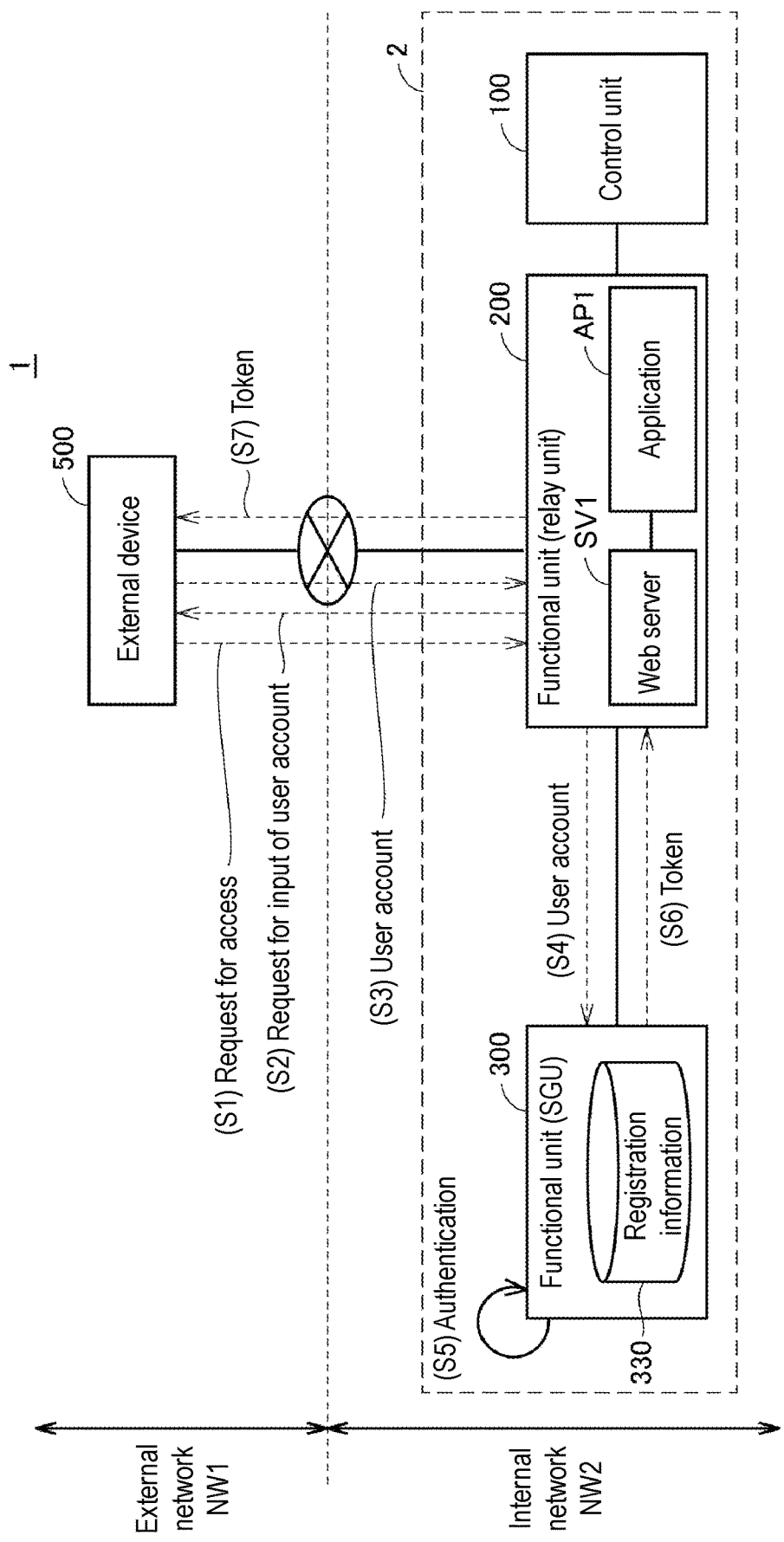
FIG. 1 is a view illustrating an example of a constitution of an information processing system according to an embodiment.

With reference to FIG. 1, an application example of the present invention will be described. FIG. 1 is a view illustrating an example of a constitution of an information processing system 1 according to the embodiment.

The information processing system 1 includes one or more control systems 2 and one or more external devices 500. The control system 2 is an FA system for automating a production process. The control system 2 includes a control unit 100, a functional unit 200 (first unit), and a functional unit 300 (second unit).

The functional unit 200 and the external device 500 are connected to an external network NW1. Communication between the functional unit 200 and the external device 500 is realized by Ethernet (registered trademark). That is, an IP address valid in the external network NW1 is allotted to each of the functional unit 200 and the external device 500, and the functional unit 200 and the external device 500 communicate with each other on the basis of the IP address.

The control unit 100, the functional unit 200, and the functional unit 300 are connected to an internal network NW2. For example, regarding communication between these units, communication between the units is realized by Ethernet. That is, an IP address valid in the internal network NW2 is allotted to each of the units constituting the control system 2, and the units communicate with each other on the basis of the IP address.

For example, the control unit 100 is a PLC. The control unit 100 controls driving equipment (not illustrated) in accordance with a user program which has been designed in advance. The driving equipment includes various kinds of industrial equipment for automating the production process. As an example, the driving equipment includes a robot controller, a servo driver, an arm robot controlled by the robot controller, a servo motor controlled by the servo driver, and the like. In addition, the driving equipment may include a visual sensor for capturing an image of a workpiece, different equipment utilized in the production process, and the like.

The functional unit 200 is connected to the control unit 100 and functions as a relay unit. That is, the functional unit 200 relays communication between each of the units constituting the control system 2 and the external device 500. Details of a communication function provided by the functional unit 200 will be described below. In addition, the functional unit 200 provides various functions for realizing control of diverse control targets by the control unit 100. The functional unit 200 includes a web server SV1 and an application AP1. The application AP1 is a program for providing various services related to the control system 2.

The functional unit 300 is a unit for centrally managing user accounts for various units constituting the control system 2. For example, the functional unit 300 is a security guard unit (SGU). The functional unit 300 retains registration information 330. Registered account information is defined in the registration information 330. As an example, each piece of the account information includes a user identification (ID) and a password. The registration information 330 is not necessarily retained by the functional unit 300 and may be retained by different equipment such as an external server.

For example, the external device 500 is a notebook-type or desktop-type personal computer (PC), a tablet terminal, a smartphone, a human machine interface (HMI), or other information processing terminals.

When the external device 500 accesses information in the functional unit 200, the functional unit 300 serving as an SGU performs authentication processing of the access. More specifically, first, the external device 500 transmits a request for access to the functional unit 200 to the functional unit 200 upon reception of the request for access to the functional unit 200 from a user (Step S1). The functional unit 200 requests an input of a user account to the external device 500 upon reception of the request for access from the external device 500 (Step S2). The external device 500 displays a screen for inputting the user account upon reception of the request for an input of an account from the functional unit 200. The external device 500 transmits the input user account to the functional unit 200 upon reception of the input of a user account from the user (Step S3).

Next, the functional unit 200 transmits the user account to the functional unit 300 upon reception of the user account from the external device 500 (Step S4). The functional unit 300 refers to the registration information 330 and determines whether or not the user account received from the functional unit 200 has been registered (Step S5).

When it is determined that the user account received in Step S4 has been registered in the registration information 330, the functional unit 300 transmits a token indicating permission of access to the functional unit 200 (Step S6). Thereafter, the functional unit 200 transmits the token received from the functional unit 300 to the external device 500 (Step S7). The external device 500 can access information (for example, the application AP1) in the functional unit 200 based on the token issued by the functional unit 300.

As stated above, the control system 2 has the functional unit 300 centrally carrying out authentication processing of user accounts. Accordingly, it is no longer necessary for the user to perform login processing for each of the units constituting the control system 2. In addition, since the number of user accounts to be managed by the user can be reduced, troublesomeness in management of user accounts can be eliminated. As a result, a probability of leakage of user accounts to the outside is reduced, and thus the security level of the control system 2 is improved.

B. Control System 2

Figure 2:
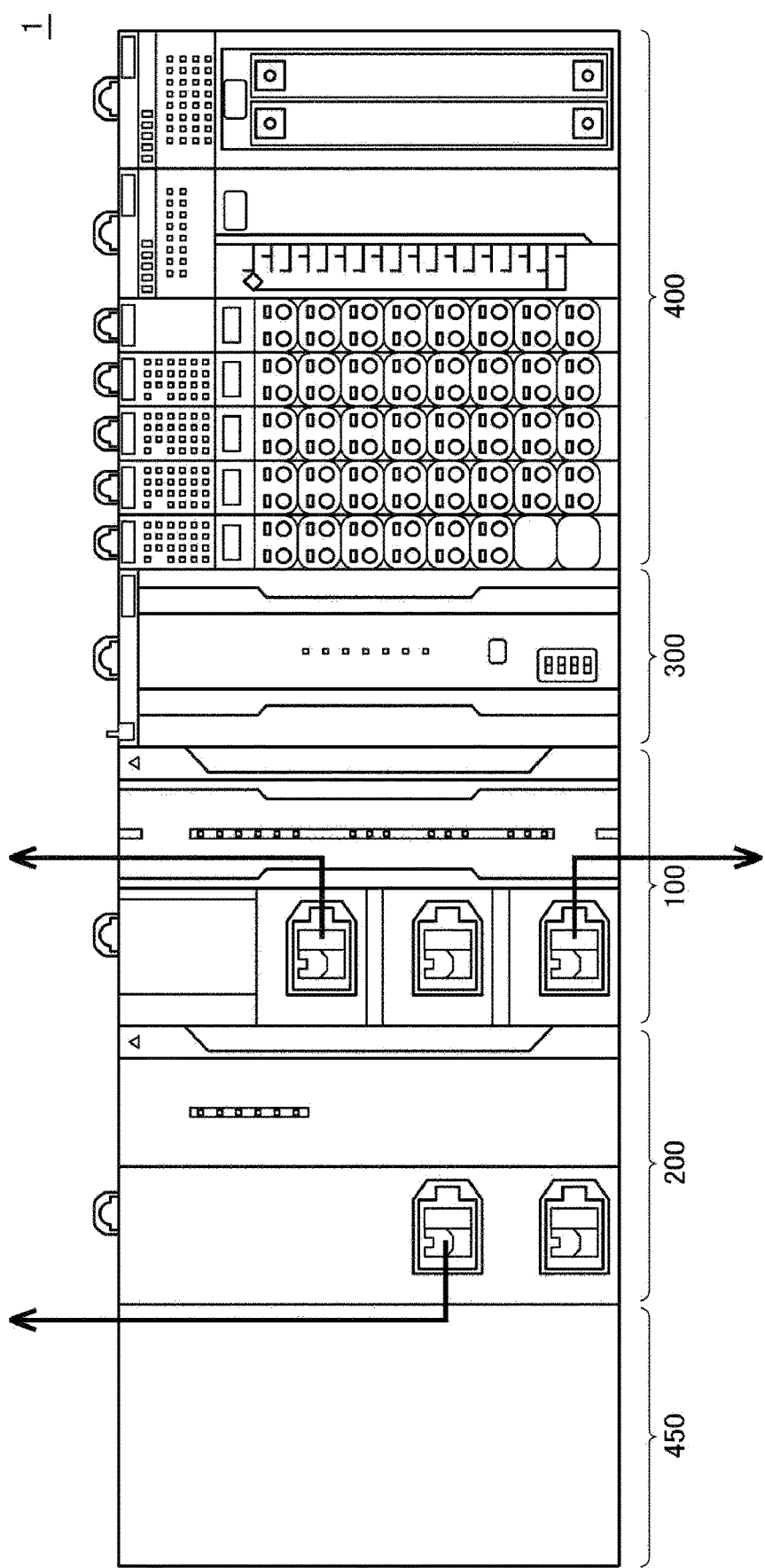
FIG. 2 is a view of an appearance illustrating an example of a constitution of a control system according to the embodiment.

With reference to FIG. 2, the control system 2 illustrated in FIG. 1 will be described. FIG. 2 is a view of an appearance illustrating an example of a constitution of the control system 2.

With reference to FIG. 2, the control system 2 includes one or a plurality of control units 100, one or a plurality of functional units 200, one or a plurality of functional units 300, one or a plurality of functional units 400, and a power source unit 450.

The control unit 100 and the functional unit 200 are connected to each other via an arbitrary data transmission line. The control unit 100, the functional unit 200, and one or a plurality of functional units 300 and 400 are connected to each other via an internal bus 10 (refer to FIG. 7) which will be described below.

The control unit 100 executes pivotal processing in the control system 2. The control unit 100 executes control computation for controlling a control target in accordance with an arbitrarily designed request specification. In the example of a constitution illustrated in FIG. 2, the control unit 100 has one or a plurality of communication ports. The control unit 100 corresponds to a processing execution part executing standard control in accordance with a standard control program.

The functional unit 200 is connected to the control unit 100 and plays a role of a function of communication with other devices. In the example of a constitution illustrated in FIG. 2, the functional unit 200 has one or a plurality of communication ports. Details of the communication function provided by the functional unit 200 will be described below.

The functional unit 300 is an optional unit and is connected to the control unit 100 as necessary. Typically, the functional unit 300 can include a security guard unit (SGU), a communication unit having a data exchange function using object linking and embedding for process control unified architecture (OPC UA), an artificial intelligence (AI) unit having a preventive maintenance function using AI, and the like.

The functional unit 400 provides various functions for realizing control of diverse control targets by the control system 2. Typically, the functional unit 400 can include an I/O unit, a safety I/O unit, a communication unit, a motion controller unit, a temperature adjustment unit, a pulse counter unit, and the like. Examples of the I/O unit include a digital input (DI) unit, a digital output (DO) unit, an analog input (AI) unit, an analog output (AO) unit, a pulse catch input unit, and a complex unit with a plurality of mixed kinds. The safety I/O unit plays a role of I/O processing related to safety control.

The power source unit 450 supplies a power source of a predetermined voltage to each of the units constituting the control system 2.

C. Example of Hardware Constitution of Each Unit

Next, an example of a hardware constitution of each of the units constituting the control system 2 according to the present embodiment will be described.

(c1: Control Unit 100)

Figure 3:
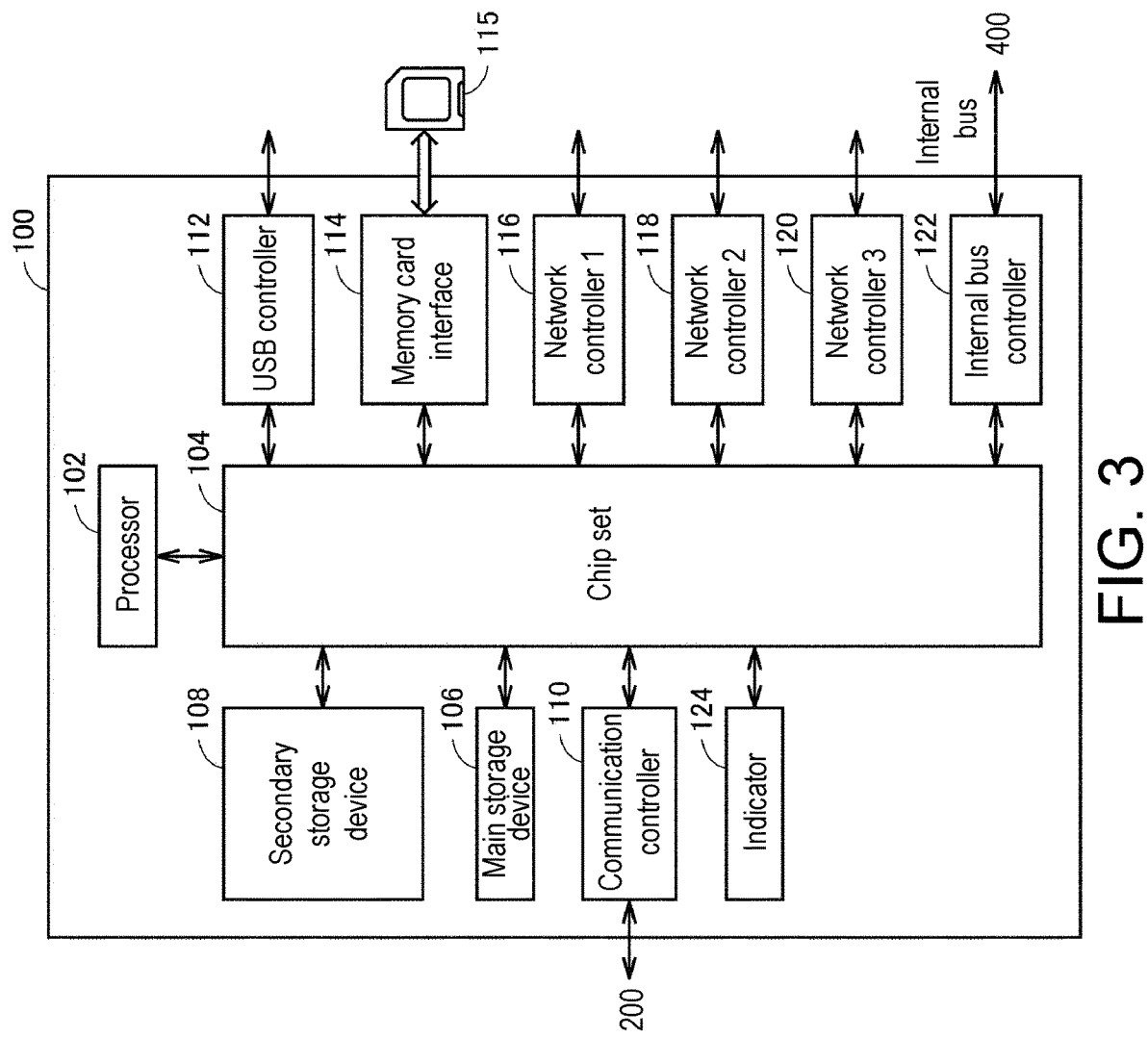
FIG. 3 is a schematic view illustrating an example of a hardware constitution of a control unit constituting the control system according to the embodiment.

FIG. 3 is a schematic view illustrating an example of a hardware constitution of the control unit 100 constituting the control system 2 according to the present embodiment. With reference to FIG. 3, as main components, the control unit 100 includes a processor 102 such as a central processing unit (CPU) or a graphical processing unit (GPU), a chip set 104, a main storage device 106, a secondary storage device 108, a communication controller 110, a universal serial bus (USB) controller 112, a memory card interface 114, network controllers 116, 118, and 120, an internal bus controller 122, and an indicator 124.

The processor 102 realizes control computation related to standard control and various kinds of processing which will be described below by reading various programs stored in the secondary storage device 108 and executing the programs developed in the main storage device 106. The chip set 104 realizes processing of the control unit 100 in its entirety by mediating transmission and reception of data between the processor 102 and each component.

In addition to a system program, a control program operated in an execution environment provided by the system program is stored in the secondary storage device 108.

The communication controller 110 plays a role of transmission and reception of data with respect to the functional unit 300. For example, regarding the communication controller 110, a communication chip corresponding to the internal bus, EtherNet, and the like can be employed.

The USB controller 112 plays a role of transmission and reception of data with respect to an arbitrary information processing device via USB connection.

The memory card interface 114 is constituted such that a memory card 115 can be attached to and detached from it, and the memory card interface 114 can write a control program or data such as various kinds of setting in the memory card 115 or can read a control program or data such as various kinds of setting from the memory card 115.

Each of the network controllers 116, 118, and 120 plays a role of transmission and reception of data with respect to an arbitrary device via a network. The network controllers 116, 118, and 120 may employ an industrial network protocol such as EtherCAT (registered trademark), EtherNet/IP (registered trademark), DeviceNet (registered trademark), or CompoNet (registered trademark).

The internal bus controller 122 plays a role of transmission and reception of data with respect to the functional unit 200, one or a plurality of functional units 300, and one or a plurality of functional units 400 constituting the control system 2. Regarding the internal bus, a unique communication protocol of a manufacturer may be used, or a communication protocol which is the same as or conforms to any of industrial network protocols may be used.

The indicator 124 notifies an operation state or the like of the control unit 100 and comprises one or a plurality of LEDs or the like disposed on the outer surface of the unit.

FIG. 3 illustrates an example of a constitution in which necessary functions are provided by the processor 102 executing a program. However, some or all of these functions to be provided may be mounted using a dedicated hardware circuit (for example, an application specific integrated circuit (ASIC) or a field-programmable gate array (FPGA)). Alternatively, a main part of the control unit 100 may be realized using hardware according to a general-purpose architecture (for example, an industrial personal computer based on a general-purpose personal computer). In this case, using a virtualization technology, a plurality of operating systems (OS) having different purposes may be executed in parallel, and an application necessary for each OS may be executed.

(c2: Functional Unit 200)

Figure 4:
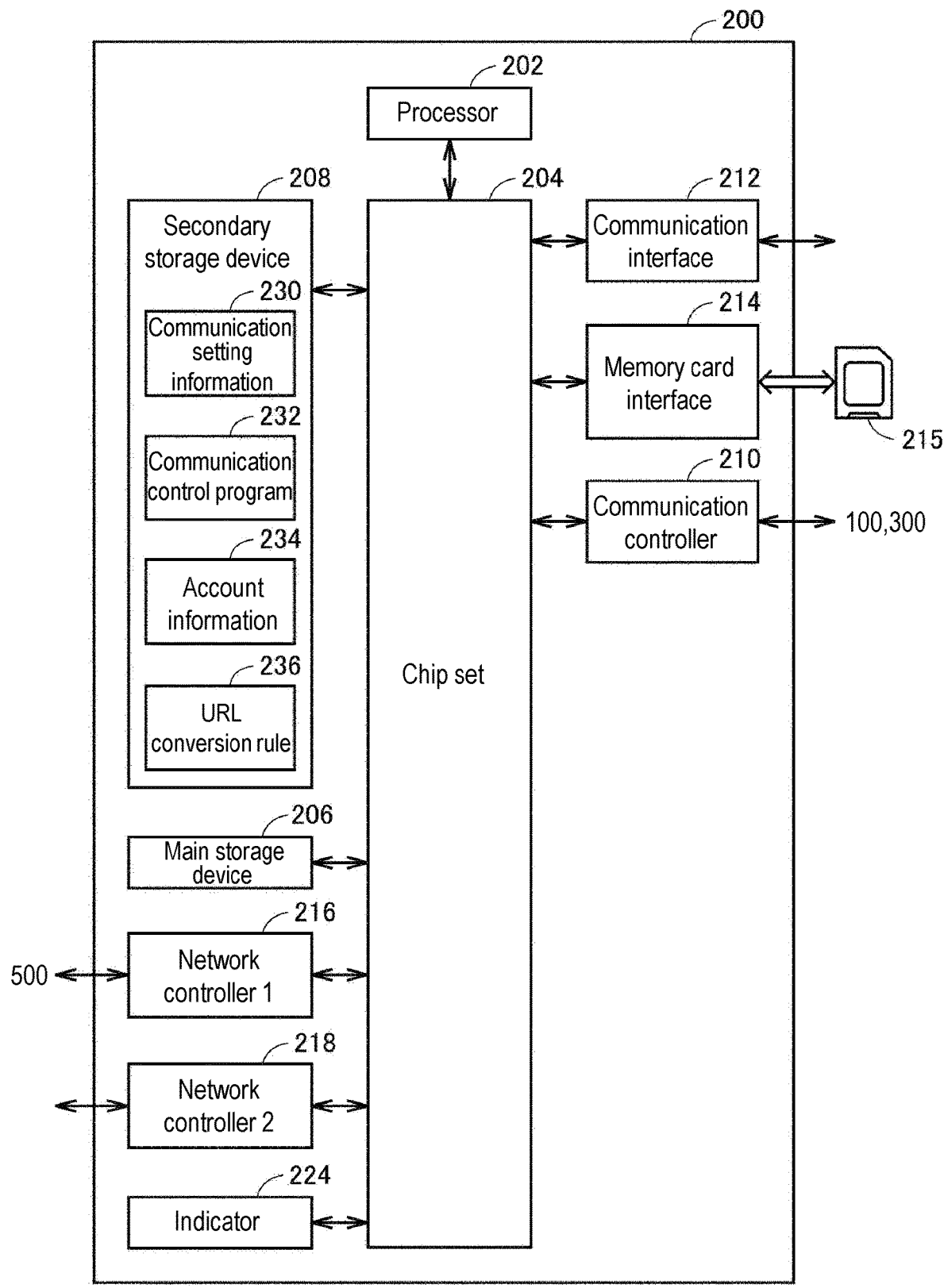
FIG. 4 is a schematic view illustrating an example of a hardware constitution of functional units constituting the control system according to the embodiment.

FIG. 4 is a schematic view illustrating an example of a hardware constitution of the functional unit 200 constituting the control system 2 according to the present embodiment. With reference to FIG. 4, as main components, the functional unit 200 includes a processor 202 such as a CPU or a GPU, a chip set 204, a main storage device 206, a secondary storage device 208, a communication controller 210, a communication interface 212, a memory card interface 214, network controllers 216 and 218, and an indicator 224.

The processor 202 realizes various communication functions which will be described below by reading various programs stored in the secondary storage device 208 and executing the programs developed in the main storage device 206. The chip set 204 realizes processing of the functional unit 200 in its entirety by mediating transmission and reception of data between the processor 202 and each component.

In addition to a system program, various kinds of data such as communication setting information 230 (which will be described below), a communication control program 232 operating in an execution environment provided by the system program, account information 234 (which will be described below), and a URL conversion rule 236 (which will be described below) are stored in the secondary storage device 208.

The communication controller 210 plays a role of transmission and reception of data with respect to the control unit 100 and the functional unit 300. For example, regarding the communication controller 210, a communication chip corresponding to the internal bus, EtherNet, and the like can be employed.

The communication interface 212 plays a role of transmission and reception of data with respect to an arbitrary information processing device via USB connection.

The memory card interface 214 is constituted such that a memory card 215 can be attached to and detached from it, and the memory card interface 214 can write a control program or data such as various kinds of setting in the memory card 215 or can read a control program or data such as various kinds of setting from the memory card 215.

Each of the network controllers 216 and 218 plays a role of transmission and reception of data with respect to an arbitrary device via a network. The network controllers 216 and 218 may employ a general-purpose network protocol such as EtherNet. As an example, the functional unit 200 communicates with the external device 500 via the network controller 216 or the network controller 218.

The indicator 224 notifies an operation state or the like of the functional unit 200 and comprises one or a plurality of LEDs or the like disposed on the outer surface of the unit.

FIG. 4 illustrates an example of a constitution in which necessary functions are provided by the processor 202 executing a program. However, some or all of these functions to be provided may be mounted using a dedicated hardware circuit (for example, an ASIC or an FPGA). Alternatively, a main part of the functional unit 200 may be realized using hardware according to a general-purpose architecture (for example, an industrial personal computer based on a general-purpose personal computer). In this case, using a virtualization technology, a plurality of OSs having different purposes may be executed in parallel, and an application necessary for each OS may be executed.

(c3: Functional Unit 300)

Figure 5:
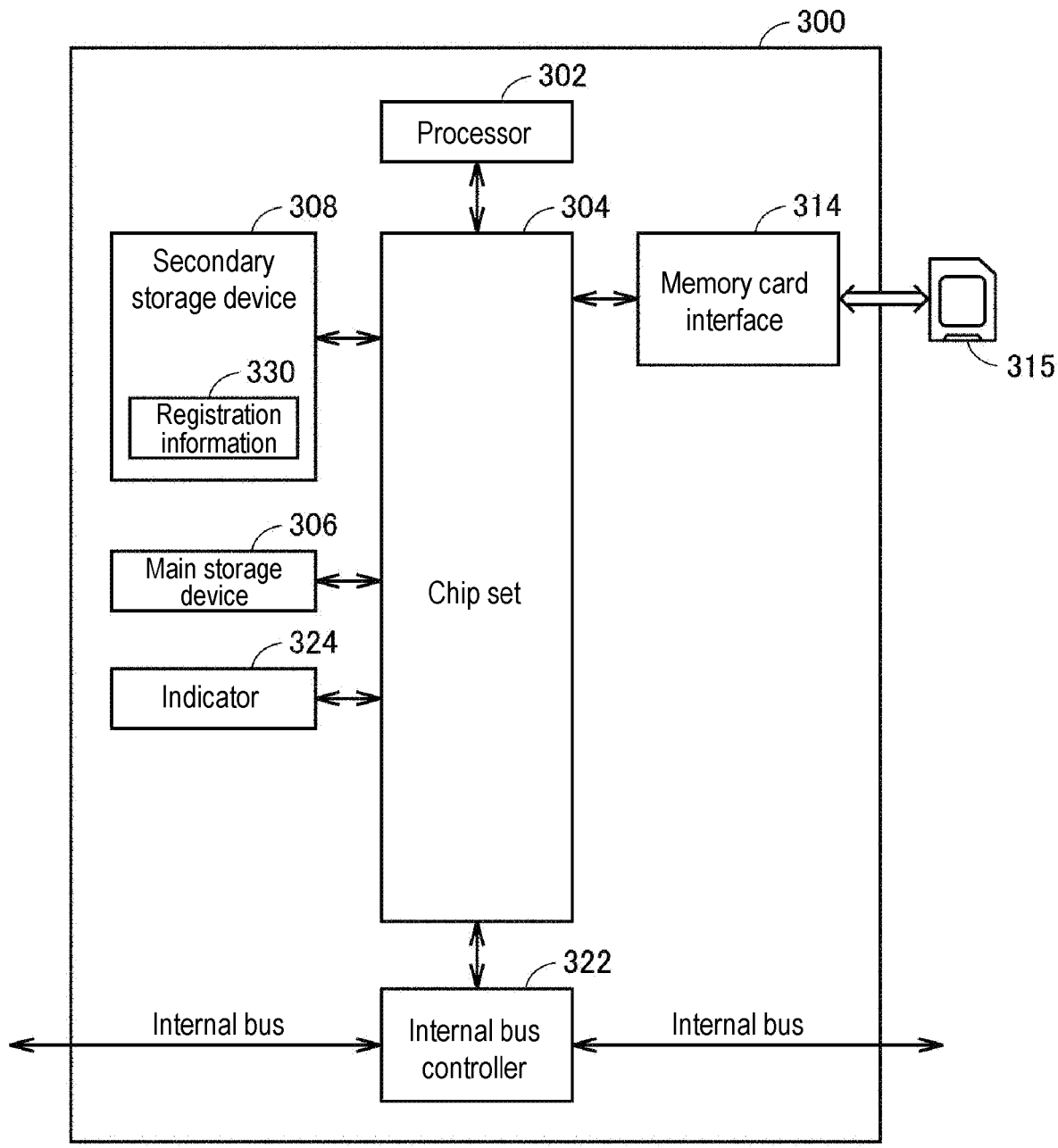
FIG. 5 is a schematic view illustrating another example of a hardware constitution of functional units constituting the control system according to the embodiment.

FIG. 5 is a schematic view illustrating an example of a hardware constitution of the functional unit 300 constituting the control system 2 according to the present embodiment. With reference to FIG. 5, as main components, the functional unit 300 includes a processor 302 such as a CPU or a GPU, a chip set 304, a main storage device 306, a secondary storage device 308, a memory card interface 314, an internal bus controller 322, and an indicator 324.

The processor 302 realizes a server function and various functions by reading various application programs stored in the secondary storage device 308 and executing the programs developed in the main storage device 306. The chip set 304 realizes processing of the functional unit 300 in its entirety by mediating transmission and reception of data between the processor 302 and each component.

In addition to a system program, an application program operating in an execution environment provided by the system program, and the registration information 330 described above (refer to FIG. 1) are stored in the secondary storage device 308.

The memory card interface 314 is constituted such that a memory card 315 can be attached to and detached from it, and the memory card interface 314 can write an application program or data such as various kinds of setting in the memory card 315 or can read an application program or data such as various kinds of setting from the memory card 315.

The internal bus controller 322 plays a role of transmission and reception of data with respect to the control unit 100 or the functional unit 200 via the internal bus.

The indicator 324 notifies an operation state or the like of the functional unit 300 and comprises one or a plurality of LEDs or the like disposed on the outer surface of the unit.

FIG. 5 illustrates an example of a constitution in which necessary functions are provided by the processor 302 executing a program. However, some or all of these functions to be provided may be mounted using a dedicated hardware circuit (for example, an ASIC or an FPGA). Alternatively, a main part of the functional unit 300 may be realized using hardware according to a general-purpose architecture (for example, an industrial personal computer based on a general-purpose personal computer). In this case, using a virtualization technology, a plurality of OSs having different purposes may be executed in parallel, and an application necessary for each OS may be executed.

D. Example of Hardware Constitution of External Device 500

Figure 6:
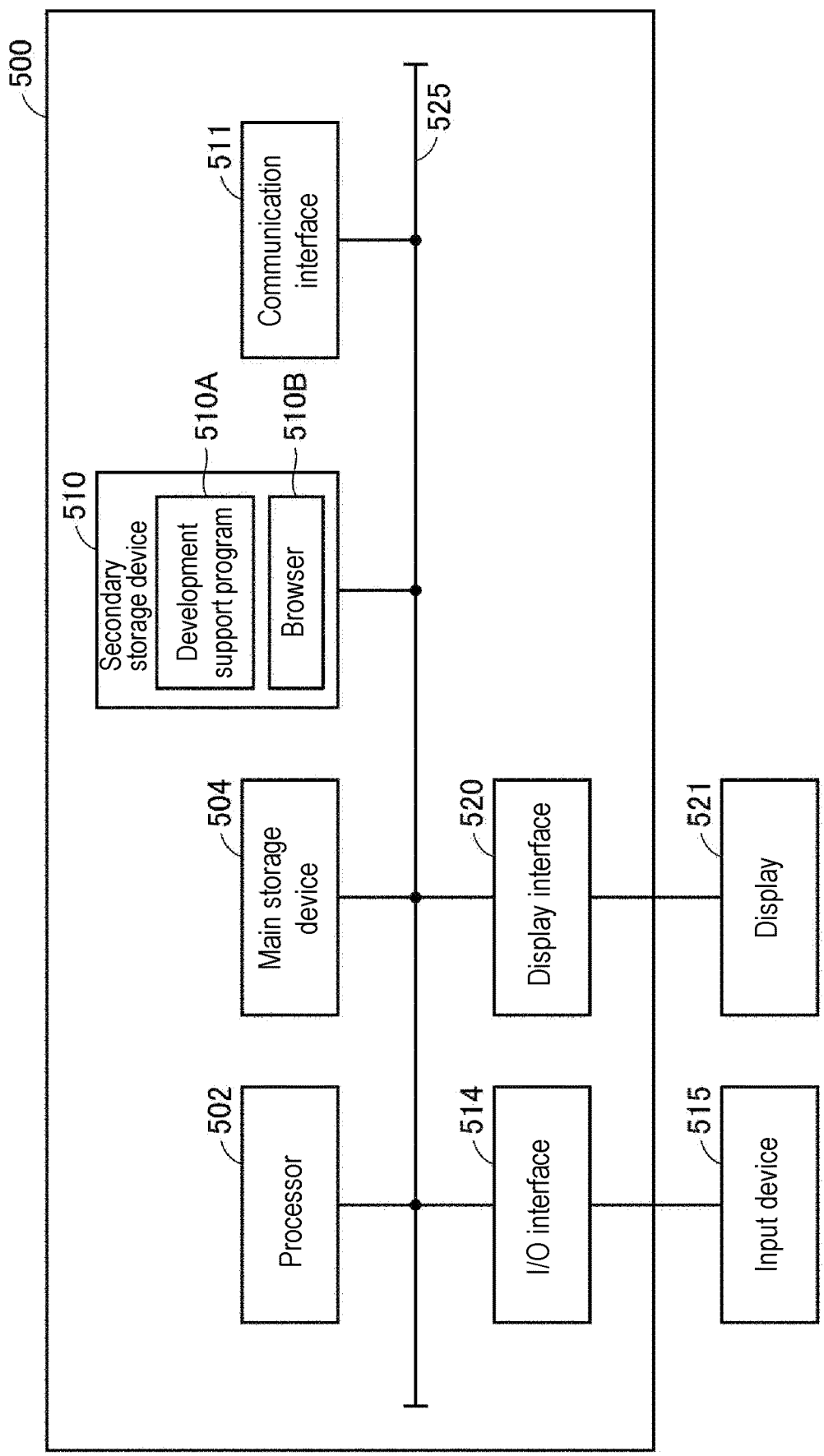
FIG. 6 is a schematic view illustrating an example of a hardware constitution of an external device constituting the information processing system according to the embodiment.

Next, with reference to FIG. 6, a hardware constitution of the external device 500 will be described in order. FIG. 6 is a schematic view illustrating an example of a hardware constitution of the external device 500 constituting the information processing system 1 according to the embodiment.

As an example, the external device 500 is constituted of a computer in conformity with a general-purpose computer architecture. The external device 500 includes a processor 502 such as a CPU or an MPU, a main storage device 504, a secondary storage device 510, a communication interface 511, an input/output (I/O) interface 514, and a display interface 520. These components are connected to each other such that they can communicate with each other via an internal bus 525.

The processor 502 controls an operation of the external device 500 by executing various control programs such as a development support program 510A or a browser application (not illustrated). The development support program 510A is a program providing an environment for developing the control program (user program) of the control system 2. The processor 502 reads the control program for an execution target from the secondary storage device 510 to the main storage device 504 upon reception of a command for executing various control programs such as the development support program 510A or the browser application 510B.

The communication interface 511 performs transmission and reception of data with respect to other communication equipment via the network. For example, the said other communication equipment includes the functional unit 200, a server, and the like. The external device 500 may be constituted such that various control programs such as the development support program 510A can be downloaded from the said other communication equipment via the communication interface 511.

The I/O interface 514 is connected to an input device 515 and takes in a signal indicating a user operation from the input device 515. Typically, the input device 515 is constituted of a keyboard, a mouse, a touch panel, a touch pad, or the like and receives an operation from a user. In the example of FIG. 6, the external device 500 and the input device 515 are illustrated as separate bodies. However, the external device 500 and the input device 515 may be integrally constituted.

The display interface 520 is connected to a display 521 and sends out an image signal for displaying an image to the display 521 in accordance with a command from the processor 502 or the like. For example, the display 521 is a liquid crystal display (LCD) or an organic electro-luminescence (EL) and presents various kinds of information to a user. The display 521 can display various screens provided by the development support program 510A. In the example of FIG. 6, the external device 500 and the display 521 are illustrated as separate bodies. However, the external device 500 and the display 521 may be integrally constituted.

E. Example of Unit Constitution of Information Processing System 1

Figure 7:
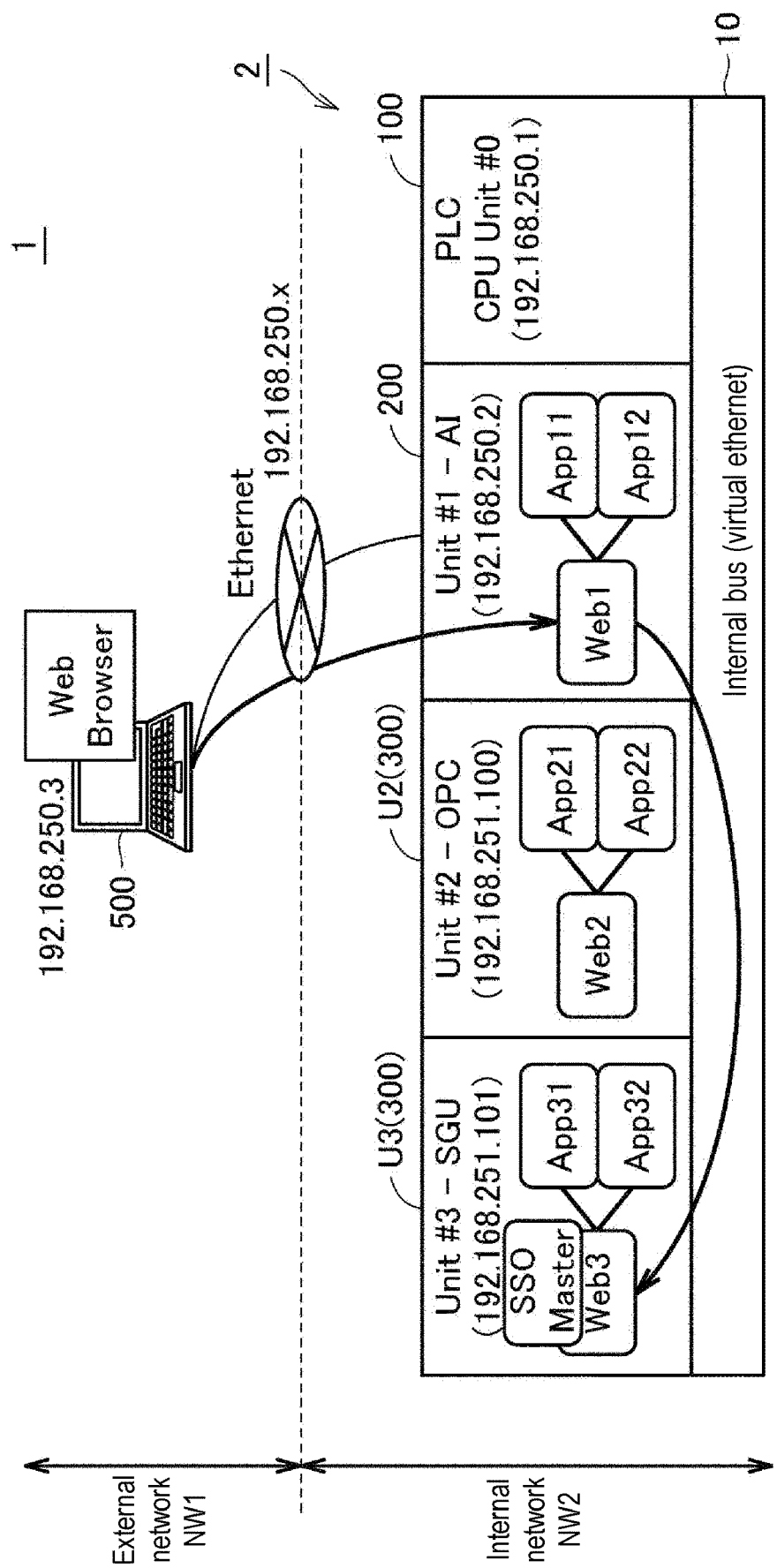
FIG. 7 is a view illustrating an example of a unit constitution of the information processing system according to the embodiment.

FIG. 7 is a view illustrating an example of a unit constitution of the information processing system 1. With reference to FIG. 7, a specific example of a unit constitution of the information processing system 1 will be described.

As illustrated in FIG. 7, the information processing system 1 includes the control system 2 and the external device 500. The control system 2 includes the control unit 100, the functional unit 200, and the functional unit 300. The control unit 100, the functional unit 200, and the functional unit 300 are connected to each other via the internal bus 10. These units communicate with each other via the internal bus 10. For example, the communication is realized by virtual Ethernet.

The functional unit 200 and the external device 500 are connected to the external network NW1. An IP address "192.168.250.3" is allotted to the external device 500. Each of the functional unit 200 and the external device 500 has a physical communication port and is connected to the external network NW1 via the communication port.

The control unit 100, the functional unit 200, and the functional unit 300 are connected to the internal network NW2. A virtual IP address "192.168.250.1" is allotted to the control unit 100. In addition, a unit name "Unit #0" is allotted to the control unit 100.

An IP address "192.168.250.2" is allotted to the functional unit 200. In addition, a unit name "Unit #1" is allotted to the functional unit 200. The functional unit 200 functions as a web server "Web1". Applications "App11" and "App12" are installed in the functional unit 200. The applications "App11" and "App12" are accessed from the web server "Web1".

In the example of FIG. 7, the functional unit 300 comprises two functional units U2 and U3. A virtual IP address "192.168.251.100" is allotted to the functional unit U2. In addition, a unit name "Unit #2" is allotted to the functional unit U2. The functional unit U2 functions as a web server "Web2". Applications "App21" and "App22" are installed in the functional unit U2. The applications "App21" and "App22" are accessed from the web server "Web2".

A virtual IP address "192.168.251.101" is allotted to the functional unit U3. In addition, a unit name "Unit #3" is allotted to the functional unit U3. The functional unit U3 functions as a web server "Web3". Applications "App31" and "App32" are installed in the functional unit U3. The applications "App31" and "App32" are accessed from the web server "Web3". In addition, the functional unit U3 has a single sign-on (SSO) function and functions as an authentication server (master).

The functional unit 200 has a reverse proxy function. More specifically, the functional unit 200 functions as a web server when a request for access is received from the external device 500. Further, the functional unit 200 rewrites the request for access received from the external device 500 and transmits the rewritten request for access to the functional unit 300 (access destination). At this time, the functional unit 200 functions as a client, and the functional unit 300 (access destination) functions as a web server. In this manner, the functional unit 200 functions as both a web server and a client.

F. Method of Generating Communication Setting Information 230

There is a need for the functional unit 200 to route a request for access from the external device 500 in order to relay communication between the external device 500 and the functional units U2 and U3. In order to realize such a relay function, the functional unit 200 generates the communication setting information 230 for routing (refer to FIG. 4) in advance.

Figure 8:
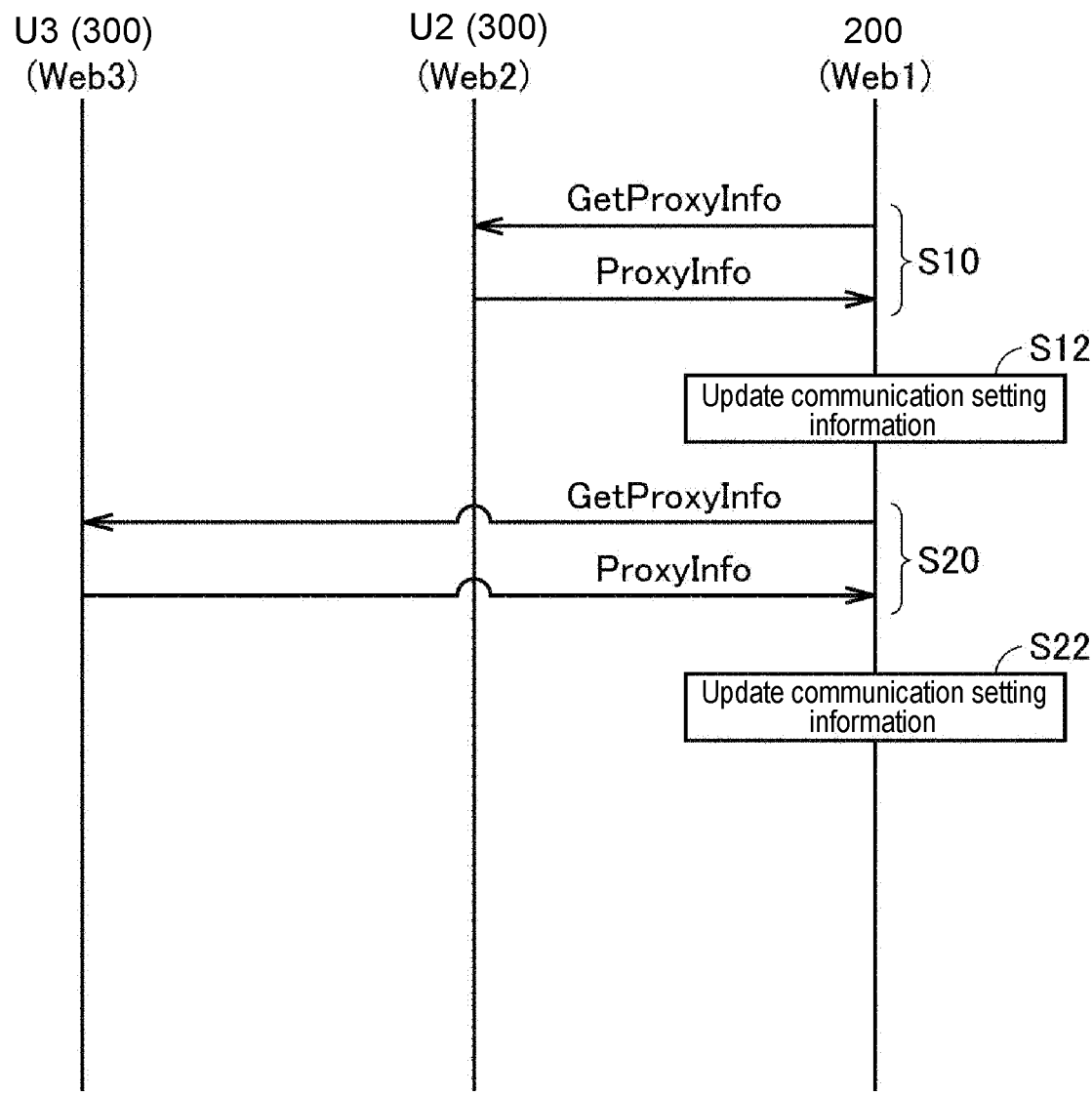
FIG. 8 is a view illustrating a data flow between the functional units at the time of generating communication setting information.

Hereinafter, with reference to FIGS. 8 to 10, a method of generating the communication setting information 230 will be described. FIG. 8 is a view illustrating a data flow between the functional unit 200 and the functional unit 300 at the time of generating the communication setting information 230. For example, the processing illustrated in FIG. 8 is executed at the time of starting the control unit 100.

In Step S10, the functional unit 200 transmits a request for acquiring information related to the functional unit U2 (which will hereinafter be referred to as "proxy information") to the functional unit U2. The functional unit U2 receives the request for acquiring and transmits proxy information of itself to the functional unit 200.

Figures 9, 10:
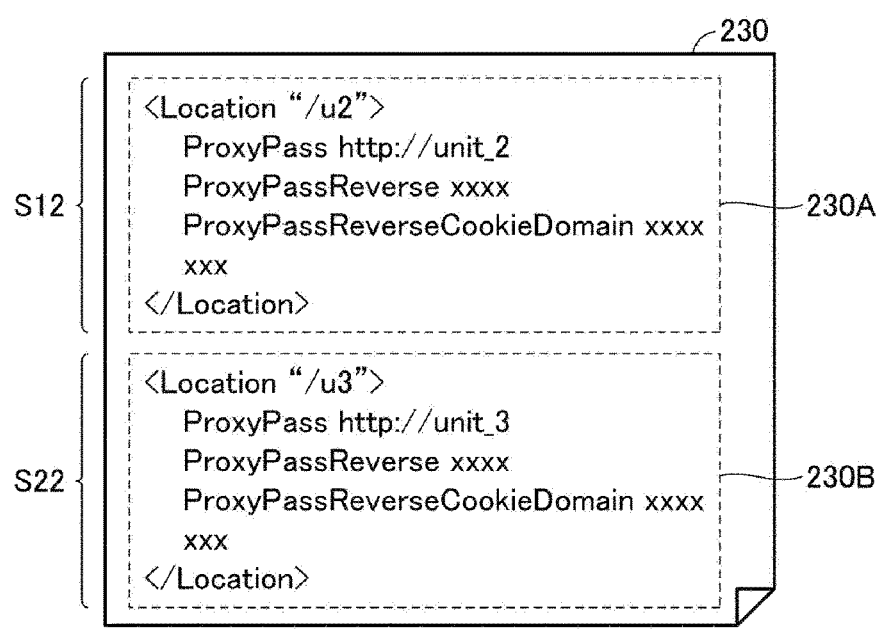
FIG. 9 is a view illustrating an example of proxy information.
FIG. 10 is a view illustrating an example of communication setting information.

FIG. 9 is a view illustrating an example of proxy information. For example, the proxy information includes a domain name, a unit name, and a host name. In the example of FIG. 9, the domain name is indicated as "AI", the unit name is indicated as "#2", and the host name is indicated as "Unit_2".

In Step S12, the functional unit 200 updates the communication setting information 230 on the basis of the proxy information received from the functional unit U2. FIG. 10 is a view illustrating an example of the communication setting information 230. In Step S12, information indicated by the dashed line 230A is added to the communication setting information 230. Accordingly, address information of the functional unit U2 (in the example of FIG. 10, the host name "Unit_2") is associated with the identifier "u2".

The identifier "u2" associated with the host name "Unit_2" is generated in accordance with a rule set in advance by the functional unit 200. Preferably, as an identifier, the functional unit 200 generates a character string allowing a user to easily identifies the functional unit U2. As an example, the identifier is generated on the basis of the domain name of the functional unit U2, the unit name of the functional unit U2, or the host name of the functional unit U2.

The address information associated with the identifier "u2" need only be able to identify the IP address of the functional unit U2 within the internal network NW2 and is not necessarily a host name. As an example, the address information associated with the identifier "u2" may be the IP address itself of the functional unit U2 in the internal network NW2 or may be a domain name of the functional unit U2.

In Step S20, the functional unit 200 transmits a request for acquiring proxy information to the functional unit U3. The functional unit U3 receives the request for acquiring and transmits proxy information of itself to the functional unit 200.

In Step S22, the functional unit 200 updates the communication setting information 230 on the basis of the proxy information received from the functional unit U3. In Step S22, information indicated by the dashed line 230B in FIG. 10 is added to the communication setting information 230. Accordingly, address information of the functional unit U3 (in the example of FIG. 10, the host name "Unit_3") is associated with an identifier "u3". The identifier "u3" is generated by the functional unit 200 in accordance with a rule similar to that of the identifier "u2".

The address information associated with the identifier "u3" need only be able to identify the IP address of the functional unit U3 within the internal network NW2 and is not necessarily a host name. As an example, the address information associated with the identifier "u3" may be the IP address itself of the functional unit U3 in the internal network NW2 or may be a domain name of the functional unit U3.

G. User Authentication Processing

The functional unit U3 serving as an SGU centrally manages user accounts for various units constituting the control system 2. That is, when there is access to each of the units of the control system 2 from the external device 500, the functional unit U3 performs user authentication processing.

Figure 11:
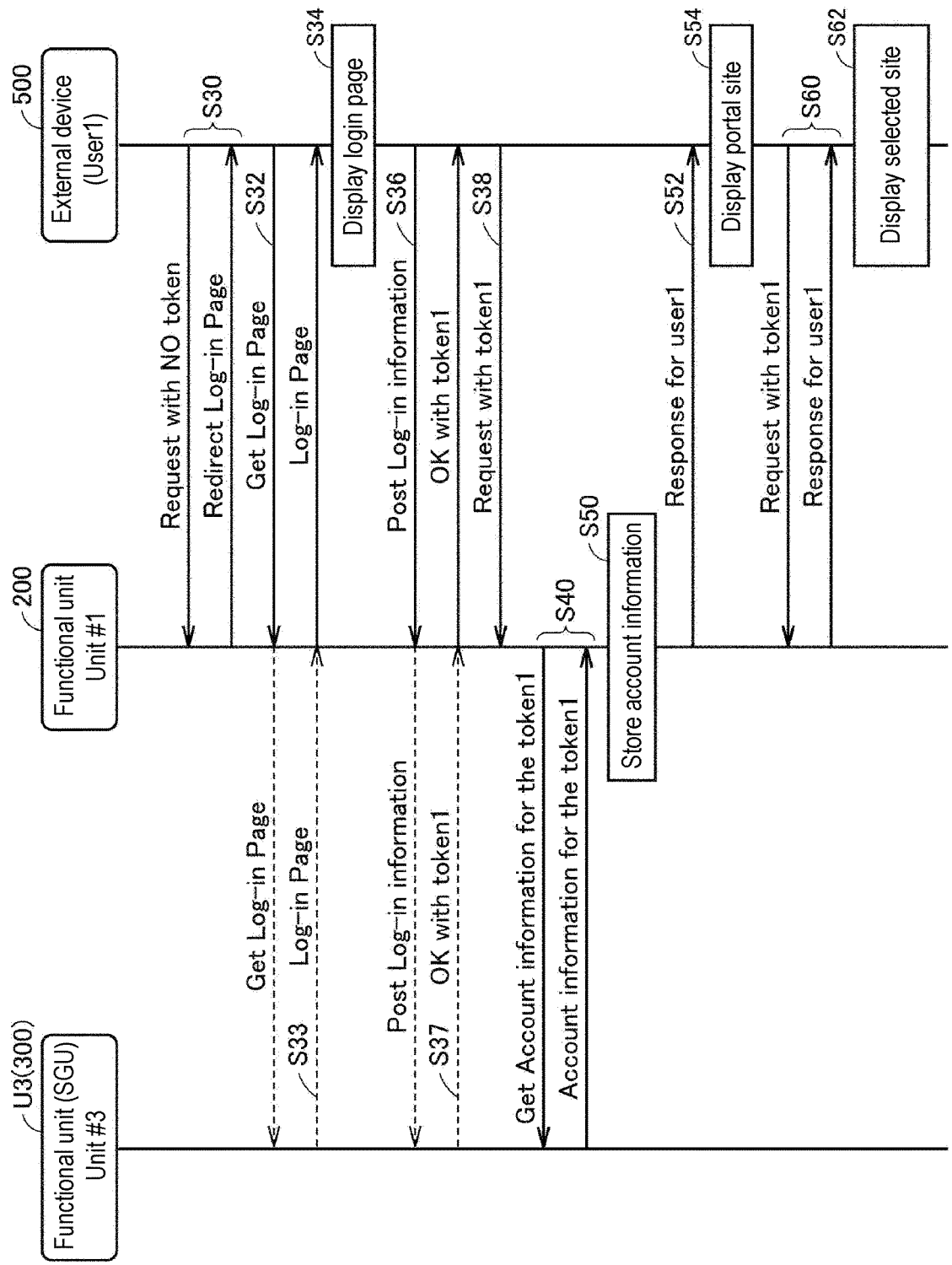
FIG. 11 is a view illustrating a data flow between the functional units and the external device at the time of user authentication processing.

Hereinafter, with reference to FIGS. 11 to 16, user authentication processing performed by the functional unit U3 will be described. FIG. 11 is a view illustrating a data flow between the functional unit 200, the functional unit U3 that is an example of the functional unit 300, and the external device 500 at the time of user authentication processing. For example, the processing illustrated in FIG. 11 is executed after starting of the control unit 100.

In Step S30, it is assumed that the external device 500 has received a request for access to the functional unit 200 from a user. For example, in this step, it is assumed that the external device 500 has received a request for displaying a portal site for access to the application of each functional unit.

The external device 500 transmits the request for access to a portal site to the functional unit 200 upon reception of the request for displaying a portal site from a user. Since a token indicating permission of access is not issued at the point of time of Step S30, the external device 500 transmits a request for access to the functional unit 200 with no token. The functional unit 200 transmits a URL of a login page to the external device 500 for redirecting to the login page upon reception of the request for access from the external device 500.

Figure 12:
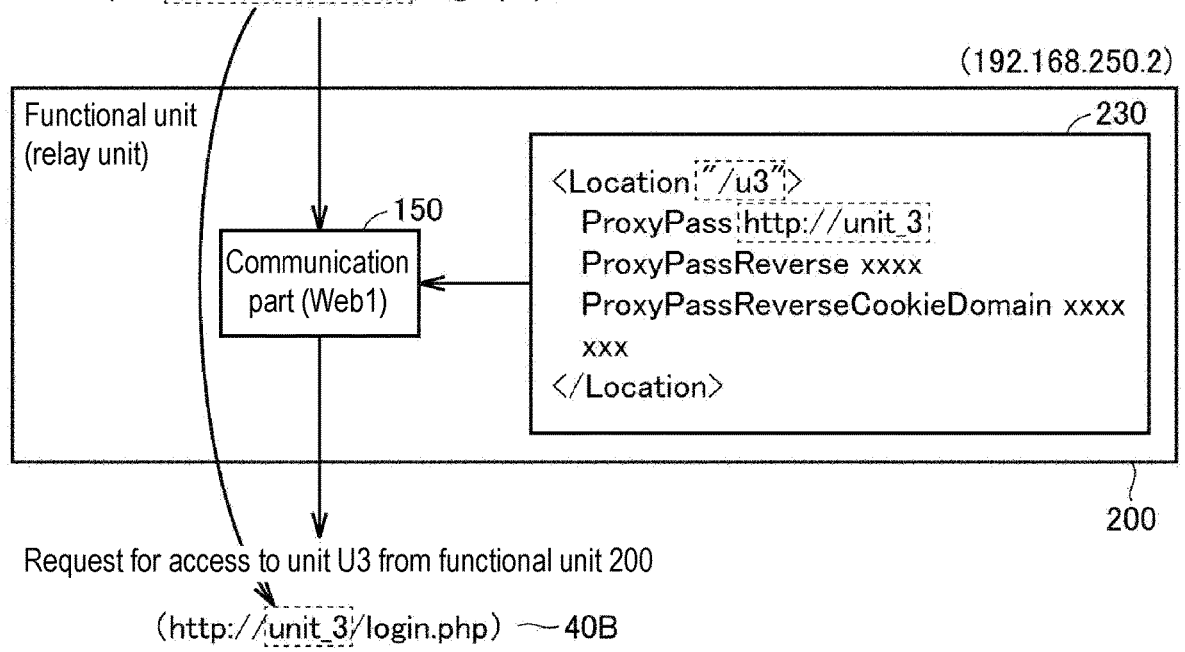
FIG. 12 is a view schematically illustrating rewriting processing of a uniform resource locator (URL).

In Step S32, the external device 500 transmits the request for access to a login page to the functional unit 200 on the basis of the URL received from the functional unit 200. The functional unit 200 acquires a URL included in the request for access received from the external device 500 and rewrites the URL. That is, in Step S32, the functional unit 200 functions as a reverse proxy server. FIG. 12 is a view schematically illustrating rewriting processing of a URL.

In FIG. 12, a request 40A for access from the external device 500 is indicated as a URL "http://192.168.250.2/u3/login.php". "192.168.250.2" indicated in the request 40A for access indicates the IP address of the functional unit 200. The element "u3" indicated in the request 40A for access indicates an identifier of a unit which is an access destination.

A communication part 150 of the functional unit 200 acquires the identifier "u3" included in the request 40A for access upon reception of the request 40A for access from the external device 500. Next, the communication part 150 refers to the communication setting information 230 described above in FIG. 10 and acquires address information corresponding to the identifier "u3". As a result, address information "unit_3" valid in the internal network NW2 is identified. Thereafter, the communication part 150 rewrites the request 40A for access and generates a request 40B for access including the address information "unit_3".

More specifically, the communication part 150 generates the request 40B for access by rewriting the identifier "u3" included in the request 40A for access with the address information "unit_3" corresponding to the identifier "u3". At this time, the domain "192.168.250.2" (that is, destination information) included in the request 40A for access is deleted. Accordingly, the request 40A for access "http://192.168.250.2/u3/App31/index.php" is rewritten to the request 40B for access "http://unit_3/login.php", and the destination is changed from the functional unit 200 to the functional unit U3. The communication part 150 transmits the rewritten request 40B for access to the functional unit U3.

With reference to FIG. 11 again, in Step S33, the functional unit U3 transmits a login page in a hypertext markup language (HTML) document to the functional unit 200. The functional unit 200 transmits the login page to the external device 500 upon reception of the login page from the functional unit U3.

Figure 13:
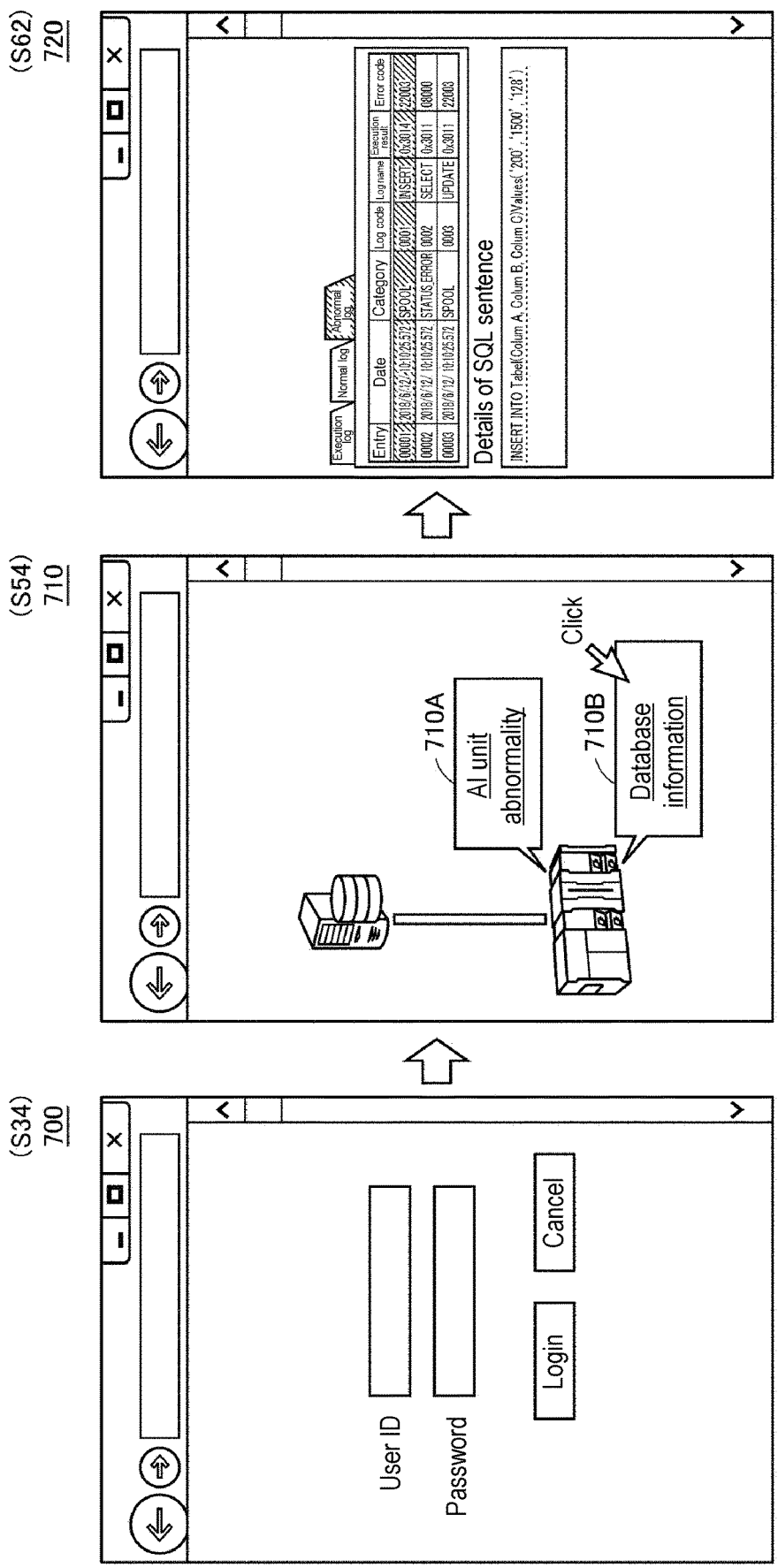
FIG. 13 is a view illustrating an example of a screen displayed in the external device according to the embodiment.

In Step S34, the external device 500 causes the display 521 to display the login page received from the functional unit 200 (refer to FIG. 6). FIG. 13 is a view illustrating an example of a screen displayed in the external device 500. FIG. 13 illustrates a login page 700 as an example of a screen displayed in the external device 500. The login page 700 receives an input of login information (account information) such as a user ID or a password. When a login button of the login page 700 is pressed, the input login information is transmitted to the functional unit 200. When a cancel button of the login page 700 is pressed, the input login information is discarded and the login page 700 is closed.

In Step S36, it is assumed that the login button of the login page 700 has been pressed. Accordingly, the external device 500 transmits the login information input to the login page 700 to the functional unit 200. Thereafter, similar to Step S32, the functional unit 200 functions as a reverse proxy server and transmits the login information received from the external device 500 to the functional unit U3.

The external device 500 refers to the registration information 330 described above (refer to FIG. 1) and executes authentication processing of the login information upon reception of the login information from the functional unit 200. FIG. 14 is a view illustrating an example of a data structure of the registration information 330. As illustrated in FIG. 14, in the registration information 330, a user name, an access authority, and a password are associated with each user ID. The functional unit U3 acquires a password corresponding to the user ID from the registration information 330 using a user ID included in the login information received from the functional unit 200 as a key. Next, the functional unit U3 compares the password acquired from the registration information 330 and the password included in the login information received from the functional unit 200 to each other. When these passwords coincide with each other, the functional unit U3 determines that the login information received from the functional unit 200 is registered in the registration information 330.

With reference to FIG. 11 again, in Step S37, it is assumed that the functional unit U3 has determined that the login information received from the functional unit 200 is registered in the registration information 330. In this case, the functional unit U3 issues a token for permitting access. In the example of FIG. 11, a "token 1" is issued. At this time, the functional unit U3 stores the issued "token 1" in the registration information 330 in association with the account information such as a user ID and an access authority. For example, the "token 1" is a random number and is valid for only a certain period of time. The external device 500 transmits the issued "token 1" to the functional unit 200. The functional unit 200 transmits the "token 1" received from the external device 500 to the external device 500.

In Step S38, the external device 500 transmits a request for displaying a portal site including a link destination to each functional unit (or each application) to the functional unit 200 again. At this time, the external device 500 also transmits the "token 1" received from the functional unit 200 to the functional unit 200.

In Step S40, the functional unit 200 transmits the "token 1" received from the external device 500 and a request for acquiring account information to the functional unit U3. Accordingly, the functional unit U3 determines the validity of the "token 1", such as whether the "token 1" is unauthorized, whether the "token 1" has not expired, or the like. When it is determined that the "token 1" is valid, the functional unit U3 refers to the registration information 330, acquires account information corresponding to the "token 1" received from the functional unit 200, and transmits the account information to the functional unit 200.

In Step S50, the functional unit 200 stores the account information received from the functional unit U3 in Step S40 in association with the "token 1".

FIG. 15 is a view illustrating the account information 234 stored in Step S50. As illustrated in FIG. 15, the account information 234 includes an account name of a user, a user name, and an access authority applied to the user. These pieces of information are associated with the "token 1".

In Step S52, the functional unit 200 generates a response to the request for access in Step S38. FIG. 16 is a view illustrating link information 30 that is an example of a generated response. The link information 30 is an HTML document defining a portal site.

The link information 30 is generated on the basis of the communication setting information 230 described above (refer to FIG. 10). More specifically, the functional unit 200 generates the link information 30 on the basis of the IP address of itself and the identifier of each of the units defined in the communication setting information 230. In the example of FIG. 12, the URL "http://192.168.250.2/u3/App31/index.php" valid in the external network NW1 is generated on the basis of the IP address "192.168.250.2" of the functional unit 200 and the identifier "u3" of the functional unit U3 defined in the communication setting information 230. The element "App31" indicated in the URL is an identifier of the application inside the functional unit U3. The functional unit 200 generates such a URL for each application inside each of the units of the control system 2 and writes it in the link information 30.

In Step S52, the functional unit 200 transmits the generated link information 30 to the external device 500.

In Step S54, the external device 500 constitutes a portal site on the basis of the received link information 30 and causes the display 521 to display the portal site (refer to FIG. 6). FIG. 13 illustrates an example of a portal site 710 displayed in the external device 500.

In the portal site 710, a link to each of the units is indicated by a hyperlink. In the example of FIG. 13, a link to the functional unit U2 that is an example of the functional unit 300 is indicated as a hyperlink 710A, and a link to the application of the functional unit 200 is indicated as a hyperlink 710B.

In Step S60, it is assumed that the hyperlink 710B of the portal site 710 has been selected. Accordingly, the external device 500 transmits a request for access according to the selected hyperlink 710B to the functional unit 200. At this time, the external device 500 also transmits the "token 1" which has already been issued to the functional unit 200.

Since the "token 1" received from the external device 500 has already been registered in the account information 234 of the functional unit 200 in Step S50, the functional unit 200 transmits a response according to the request for access in Step S60 to the external device 500 without executing account acquire processing in Step S40 described above.

In Step S62, the external device 500 displays a site (homepage) corresponding to the hyperlink 710B on the basis of the response received from the functional unit 200. FIG. 13 illustrates an example of a site 720 displayed in Step S62.

The "token 1" issued for a certain functional unit (for example, the functional unit 200) also becomes valid for other functional units (for example, the functional units U2 and U3). As an example, it is assumed that the "token 1" has been issued at the time of access to the functional unit 200 and the external device 500 has received a request for access to the functional unit U2 from a user.

In this case, first, the external device 500 transmits a request for access to the functional unit U2 (third functional unit) to the functional unit 200 (first functional unit) serving as a relay unit. At this time, the external device 500 also transmits the "token 1" which has already been issued to the relay unit. When the "token 1" is received from the external device 500 together with a request for access, the relay unit determines whether or not the "token 1" has already been registered in the account information 234. When it is determined that the "token 1" has already been registered in the account information 234, the relay unit permits access to the functional unit U2 without user authentication. Thereafter, the functional unit U2 acquires information of the access destination inside the functional unit U2 and transmits the acquired information to the external device 500 via the relay unit. In this manner, if the "token 1" which has been issued at the time of access to a certain functional unit is also diverted at the time of access to other functional units, it is no longer necessary for a user to perform login processing every time.

H. Modification Example 1 of Control Flow of Information Processing System 1

In the example of FIG. 11 described above, regardless of the access authority applied to a login user, the same portal site 710 has been displayed in Step S54. In contrast, in the present modification example, the external device 500 changes display contents of the portal site 710 in accordance with the access authority of the login user.

Hereinafter, with reference to FIGS. 17 to 19, an example in which the display contents of the portal site 710 differ between the login user to an external device 500A and the login user to an external device 500B will be described.

Figure 17:
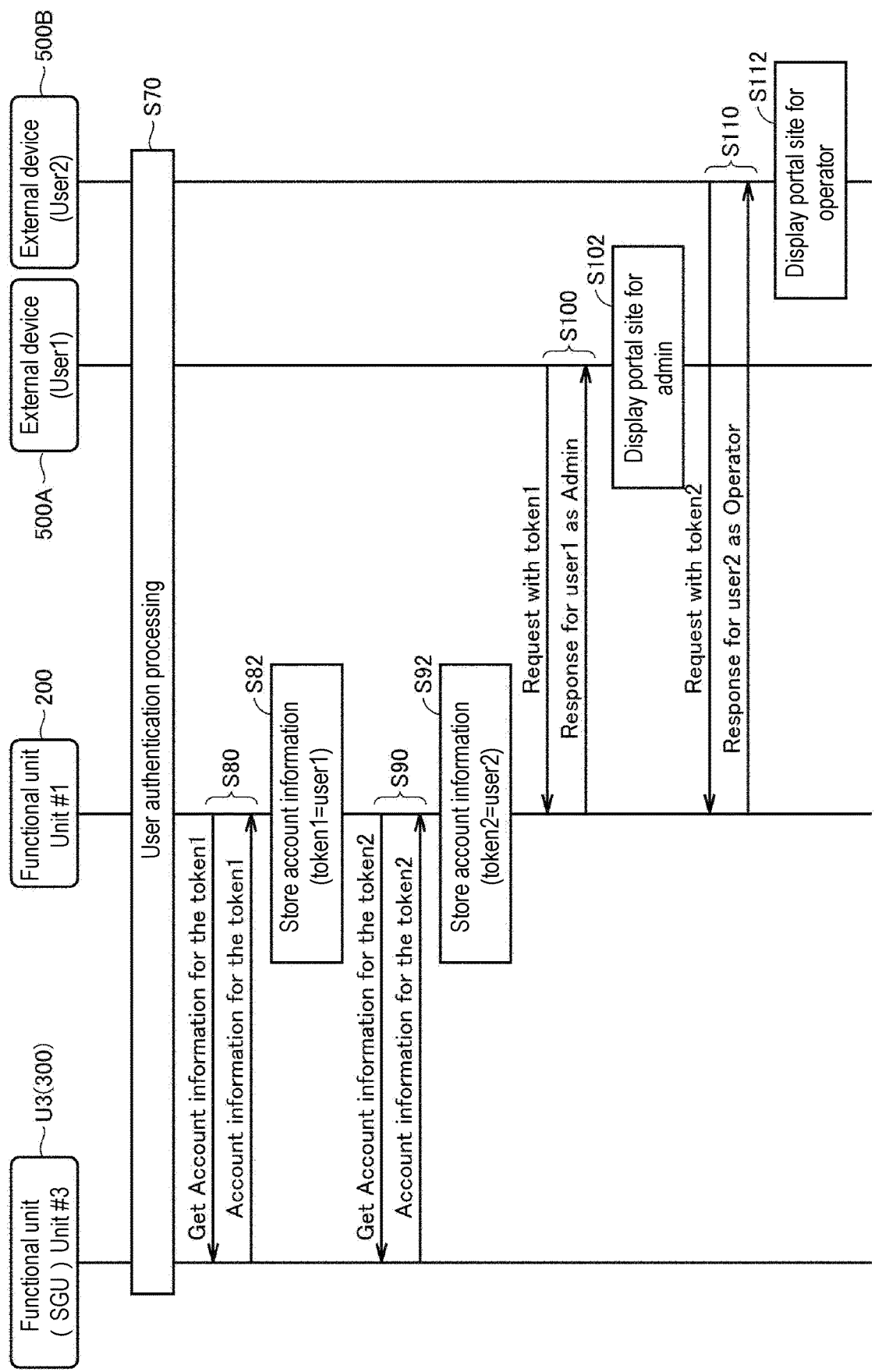
FIG. 17 is a view illustrating a data flow between the functional units and the external devices at the time of authentication processing performed by the functional units.
Figure 18:
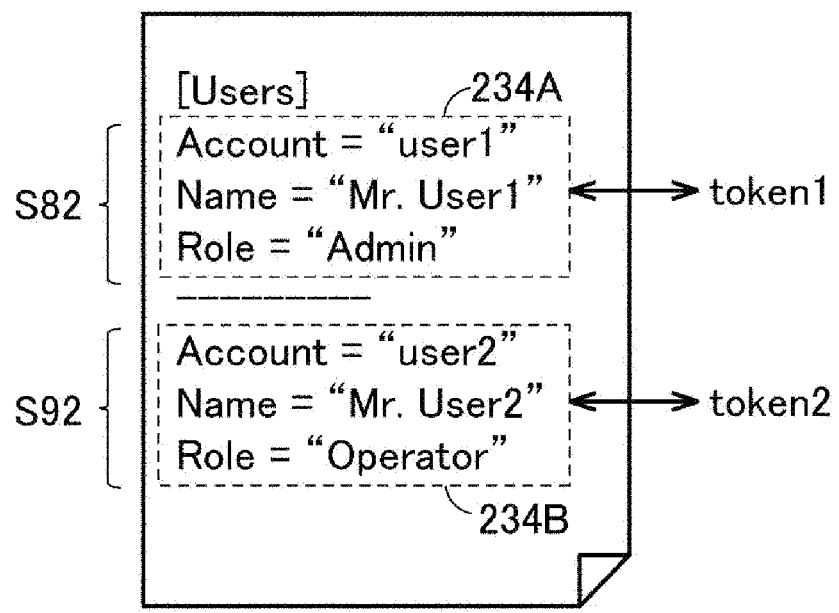
FIG. 18 is a view illustrating an example of account information stored in the functional unit.

FIG. 17 is a view illustrating a data flow between the functional unit 200, the functional unit U3 (an example of the functional unit 300), and the external devices 500A and 500B at the time of authentication processing by the functional unit U3.

In Step S70, user authentication processing for the external device 500A and user authentication processing for the external device 500B are performed. The user authentication processing is as described in the foregoing Steps S30, S32, S33, S34, S36, S37, and S38 of FIG. 11. That is, in Step S70, processing of the foregoing Steps S30, S32, S33, S34, S36, S37, and S38 of FIG. 11 is executed for each of the external device 500A and the external device 500B. As a result, it is assumed that the functional unit U3 has issued the "token 1" to the external device 500A and has issued a "token 2" to the external device 500B.

In Step S80, the functional unit 200 transmits the "token 1" received from the external device 500A and a request for acquiring account information to the functional unit U3. The functional unit U3 refers to the registration information 330 described above (refer to FIG. 14) upon reception of these and acquires account information corresponding to the "token 1". Thereafter, the functional unit U3 transmits the acquired account information to the functional unit 200.

In Step S82, the functional unit 200 stores the account information received from the functional unit U3 in association with the "token 1". FIG. 18 is a view illustrating an example of the account information 234 stored in the functional unit 200. In Step S82, information indicated by a dashed line 234A is added to the account information 234. For example, the information added to the account information 234 includes an account name of a user, a user name, and an access authority applied to the user. These pieces of account information are associated with the "token 1".

In Step S90, the functional unit 200 transmits the "token 2" received from the external device 500B and a request for acquiring account information to the functional unit U3. The functional unit U3 refers to the registration information 330 described above (refer to FIG. 14) upon reception of these and acquires account information corresponding to the "token 2". Thereafter, the functional unit U3 transmits the acquired account information to the functional unit 200.

In Step S92, the functional unit 200 stores the account information received from the functional unit U3 in association with the "token 2". In Step S92, information indicated by a dashed line 234B in FIG. 18 is added to the account information 234. For example, the information added to the account information 234 includes an account name of a user, a user name, and an access authority applied to the user. These pieces of account information are associated with the "token 2".

In Step S100, the external device 500A transmits the URL of the portal site 710 to the functional unit 200 as a request for access. At this time, the external device 500A also transmits the "token 1" issued for the external device 500A to the functional unit 200.

The functional unit 200 generates a response to the URL upon reception of the URL of the portal site 710 and the "token 1" from the external device 500A. At this time, the functional unit 200 converts the URL received from the external device 500A in accordance with the access authority of a user of the external device 500A.

Figure 19:
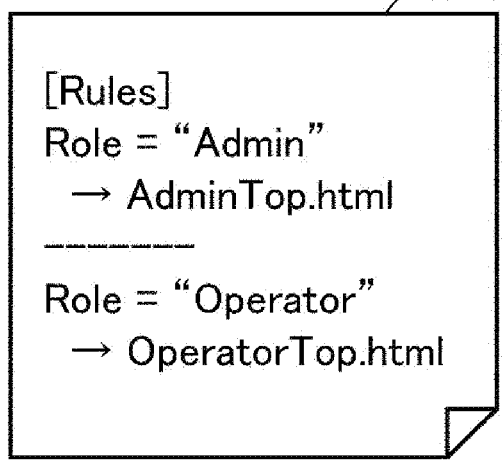
FIG. 19 is a view illustrating an example of a URL conversion rule.

For example, the URL is converted on the basis of the URL conversion rule 236 illustrated in FIG. 19. FIG. 19 is a view illustrating an example of the URL conversion rule 236. In the URL conversion rule 236, a display file name of an HTML is defined for each access authority. A correspondence relation between a display file and an access authority may be defined in advance or may be arbitrarily changed by a user.

More specifically, first, the functional unit 200 refers to the account information 234 described above (refer to FIG. 18) and acquires an access authority corresponding to the "token 1". In the example of FIG. 18, an access authority "Admin" is acquired. Next, the functional unit 200 refers to the URL conversion rule 236 and acquires a display file name corresponding to the access authority "Admin". In the example of FIG. 19, "AdminTop.html" is acquired. Thereafter, the functional unit 200 converts the display file name of the URL received from the external device 500A into "AdminTop.html". Further, the functional unit 200 accesses the URL after conversion and transmits a corresponding HTML file to the external device 500A. Accordingly, the access destination is changed in accordance with the access authority applied to a login user of the external device 500A.

In Step S102, the external device 500A displays the portal site 710 for the access authority "Admin" on the basis of the HTML file received from the functional unit 200.

In Step S110, the external device 500B transmits the URL of the portal site 710 to the functional unit 200 as a request for access. At this time, the external device 500B also transmits the "token 2" issued for the external device 500B to the functional unit 200.

The functional unit 200 generates a response to the URL upon reception of the URL of the portal site 710 and the "token 2" from the external device 500B. At this time, the functional unit 200 converts the URL received from the external device 500B in accordance with the access authority of a user of the external device 500B.

For example, the URL is converted on the basis of the URL conversion rule 236 illustrated in FIG. 19. More specifically, first, the functional unit 200 refers to the account information 234 (refer to FIG. 18) and acquires an access authority corresponding to the "token 2". In the example of FIG. 18, an access authority "Operator" is acquired. Next, the functional unit 200 refers to the URL conversion rule 236 and acquires a display file name corresponding to the access authority "Operator". In the example of FIG. 19, "OperatorTop.html" is acquired. Thereafter, the functional unit 200 converts the display file name of the URL received from the external device 500B into "OperatorTop.html". Further, the functional unit 200 accesses the URL after conversion and transmits a corresponding HTML file to the external device 500B. Accordingly, the access destination is changed in accordance with the access authority applied to a login user of the external device 500B.

In Step S112, the external device 500B displays the portal site 710 for the access authority "Operator" on the basis of the HTML file received from the functional unit 200.

As stated above, the functional unit U3 refers to the account information 234 upon reception of the user account from the external device 500, identifies the access authority associated with the user account, and further transmits the identified access authority to the functional unit 200 when a token is transmitted to the functional unit 200. When a request for access is received from the external device 500, the functional unit 200 transmits information according to the access authority of a login user of the external device 500 to the external device 500. Accordingly, the functional unit 200 can change the information to provide in accordance with the access authority applied to a user.

I. Modification Example 2 of Control Flow of Information Processing System 1

In the example of FIG. 17 described above, the display contents of the portal site 710 have been changed in accordance with the access authority applied to a login user. In contrast, in the present modification example, the display contents of the portal site 710 are also changed in accordance with a current operation mode of the control system 2.

The operation mode of the control system 2 includes a maintenance mode indicating that the control system 2 is under maintenance, in addition to a normal mode. When a condition which is set in advance and indicates that maintenance of the control system 2 has started is satisfied, the operation mode of the control system 2 shifts the operation mode to the maintenance mode. For example, the condition set in advance is satisfied when a physical key inserted into the control system 2, when a password for maintenance is input to the control system 2, or when an operation of transition to the maintenance mode is performed.

Hereinafter, with reference to FIGS. 20 to 24, an example in which the display contents of the portal site 710 are changed in the maintenance mode will be described.

Figure 20:
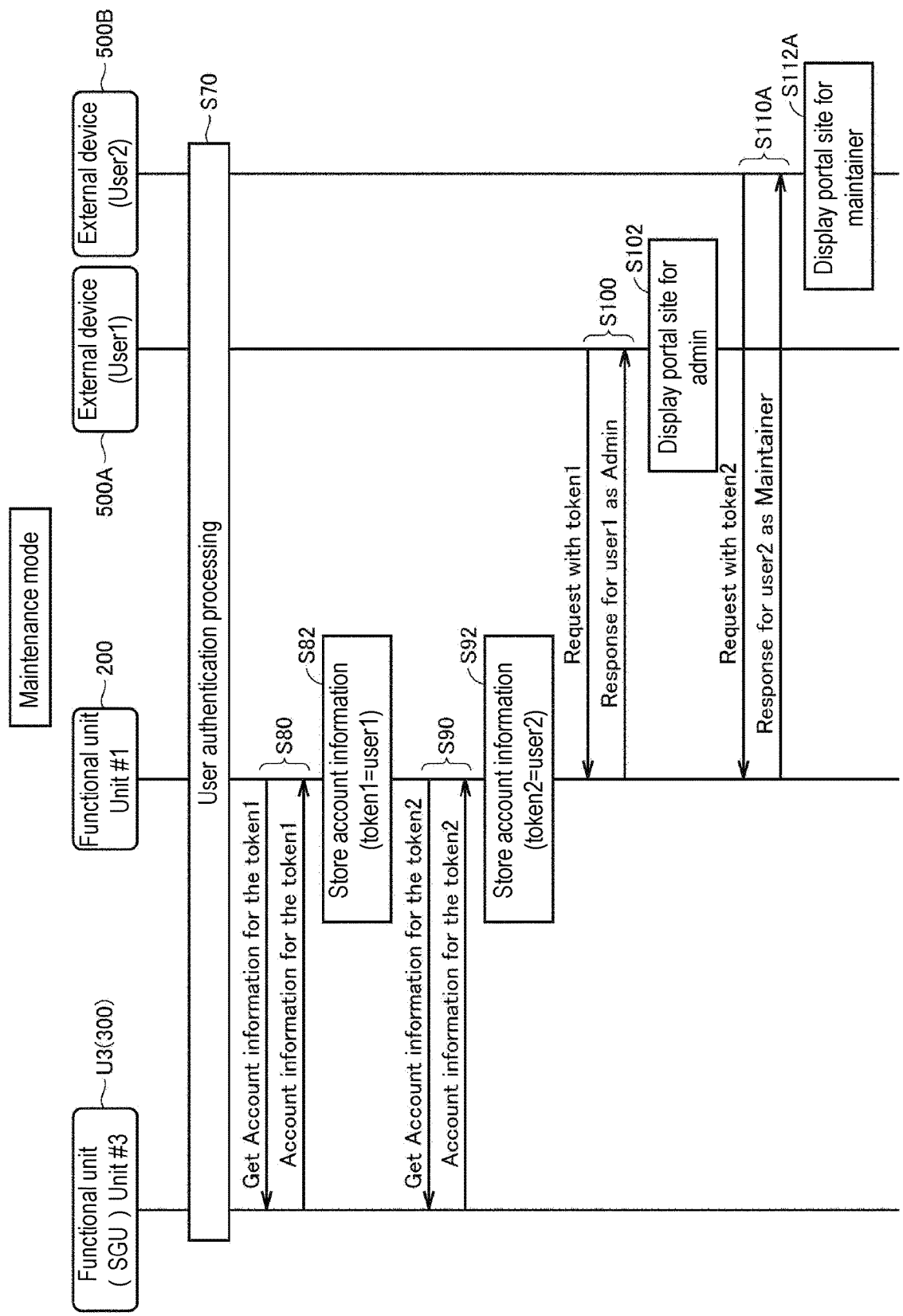
FIG. 20 is a view illustrating a data flow between the functional unit and the external devices at the time of being in a maintenance mode.

FIG. 20 is a view illustrating a data flow between the functional unit 200, the functional unit U3 (an example of the functional unit 300), and the external devices 500A and 500B at the time of being in the maintenance mode. Processing other than Steps S110A and S112A illustrated in FIG. 20 is as described in FIG. 17, and thus description thereof will not be repeated.

When the operation mode of the control system 2 is the maintenance mode, the access authority of a kind set in advance is rewritten as an access authority of another kind set in advance. A main constituent rewriting the access authority may be the functional unit 200 or may be the functional unit U3.

Figure 21:
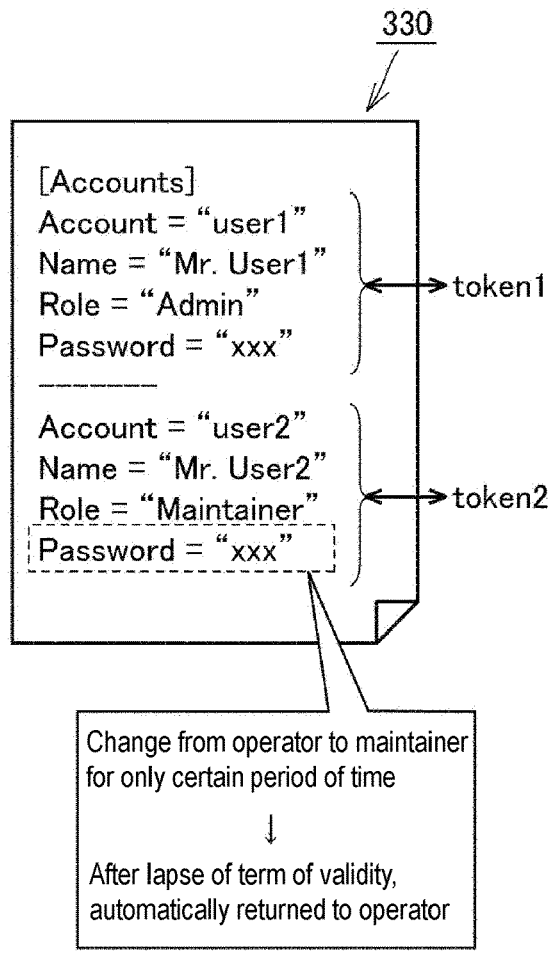
FIG. 21 is a view for explaining an example in which the functional unit rewrites an access authority.

FIG. 21 is a view for explaining an example in which the functional unit U3 rewrites an access authority. FIG. 21 is a view illustrating the registration information 330 of which the access authority is rewritten. For example, the registration information 330 is stored in the secondary storage device 308 of the functional unit U3. As illustrated in FIG. 21, during the maintenance mode, for example, the functional unit U3 rewrites the access authority "Operator" of a kind which is set in advance and defined in the registration information 330 as "Maintainer".

Accordingly, in Step S90 of FIG. 20, when the functional unit U3 acquires account information corresponding to the "token 2" from the registration information 330, "Maintainer" is acquired as an access authority. Accordingly, in Step S110A, the functional unit 200 transmits information according to the access authority "Maintainer" to the external device 500B.

More specifically, in Step S110A, the external device 500B transmits the URL of the portal site 710 to the functional unit 200 as a request for access. At this time, the external device 500B also transmits the "token 2" issued for the external device 500B to the functional unit 200. The functional unit 200 generates a response to the URL upon reception of the URL of the portal site 710 and the "token 2" from the external device 500B. At this time, the functional unit 200 converts the URL received from the external device 500B in accordance with the access authority of a user of the external device 500B.

Figure 22:
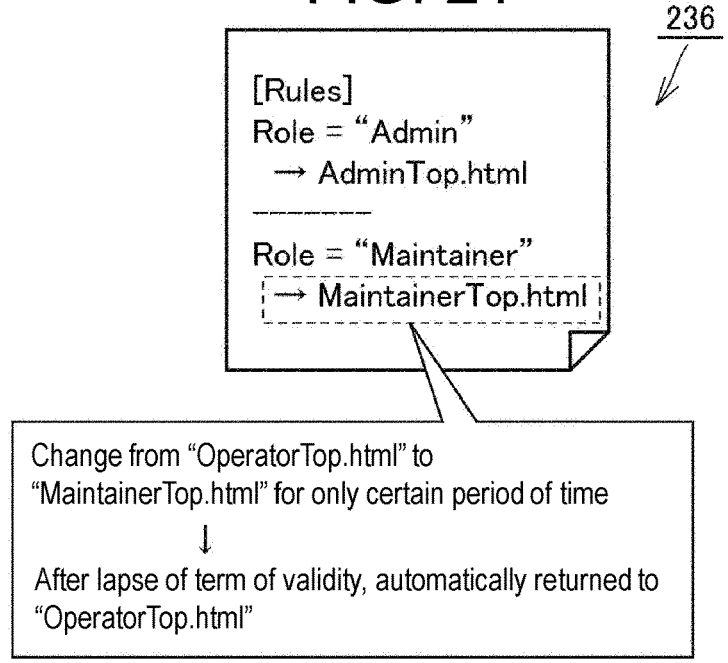
FIG. 22 is a view illustrating a URL conversion rule during the maintenance mode.

For example, the URL is converted on the basis of the URL conversion rule 236 illustrated in FIG. 22. FIG. 22 is a view illustrating the URL conversion rule 236 during the maintenance mode.

The functional unit 200 refers to the URL conversion rule 236 and acquires a display file name corresponding to the access authority "Maintainer". In the example of FIG. 22, "MaintainerTop.html" is acquired. Thereafter, the functional unit 200 converts the display file name of the URL received from the external device 500B into "MaintainerTop.html". Accordingly, regarding the access authority of a predetermined kind, the access destination is changed at the time of being in the maintenance mode. Further, the functional unit 200 accesses the URL after conversion and transmits a corresponding HTML file to the external device 500B.

In Step S112A, the external device 500B displays the portal site 710 for the access authority "Maintainer" on the basis of the HTML file received from the functional unit 200.

In the foregoing description, an example in which the functional unit U3 rewrites the access authority defined in the registration information 330 as "Maintainer" has been described. However, a main constituent rewriting the access authority may not be the functional unit U3. As an example, rewriting of the access authority may be performed by the functional unit 200. In this case, the functional unit 200 rewrites the access authority defined in the account information 234 described above as "Maintainer".

Figure 23:
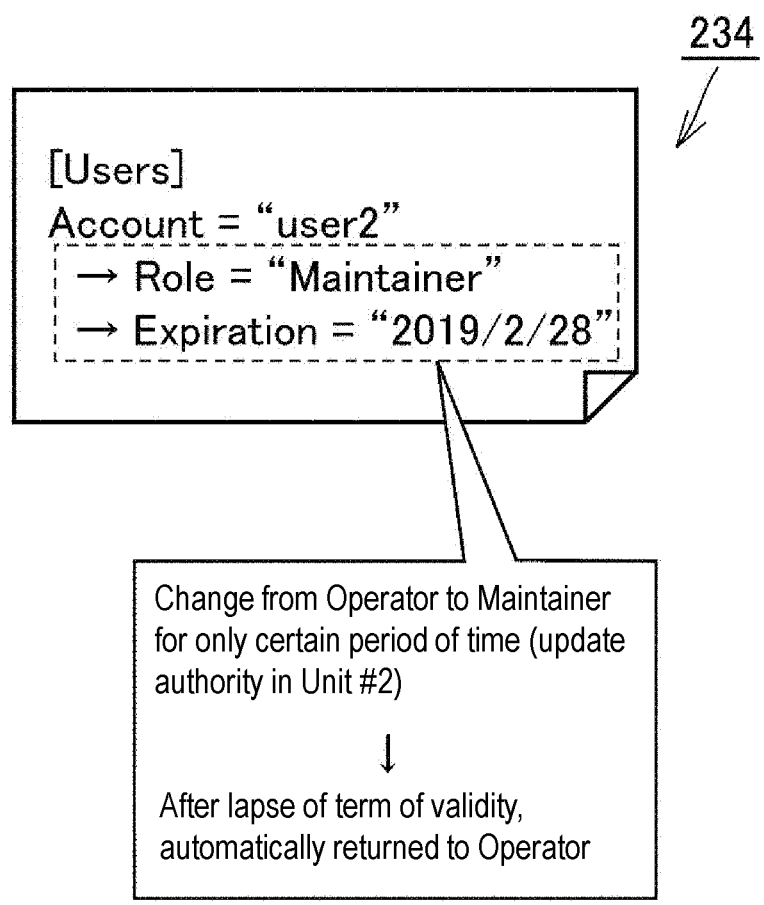
FIG. 23 is a view illustrating account information during the maintenance mode.

FIG. 23 is a view illustrating the account information 234 during the maintenance mode. For example, the account information 234 is stored in the secondary storage device 208 of the functional unit 200. As illustrated in FIG. 23, during the maintenance mode, the functional unit 200 rewrites the access authority "Operator" of a predetermined kind defined in the account information 234 as "Maintainer". In addition, the functional unit 200 writes a term of validity of the access authority "Maintainer" in the account information 234.

Thereafter, in Step S110A, the functional unit 200 refers to the account information 234 and transmits information according to the access authority "Maintainer" to the external device 500B.

As stated above, when the operation mode of the control system 2 is the maintenance mode, the access authority of a predetermined kind defined in the registration information 330 is rewritten as "Maintainer", or the access authority of a predetermined kind defined in the account information 234 is rewritten as "Maintainer". When an ending conditions which is set in advance and indicates that maintenance of the control system 2 has ended is satisfied, the access authority rewritten as "Maintainer" is automatically restored to the access authority before being rewritten. A main constituent restoring the access authority to the original access authority may be the functional unit 200 or may be the functional unit U3.

Various methods are adopted to determine whether or not the condition for ending the maintenance mode is satisfied. As an example, it is determined that the condition for ending the maintenance mode has been satisfied upon expiration of the term of validity set for the access authority "Maintainer". Alternatively, it is determined that the condition for ending the maintenance mode has been satisfied upon pulling of a physical key inserted into the control system 2. Alternatively, it is determined that the condition for ending the maintenance mode has been satisfied upon an operation of ending maintenance performed by a user.

J. Modification Example 1 of Device Constitution of Information Processing System 1

Figure 24:
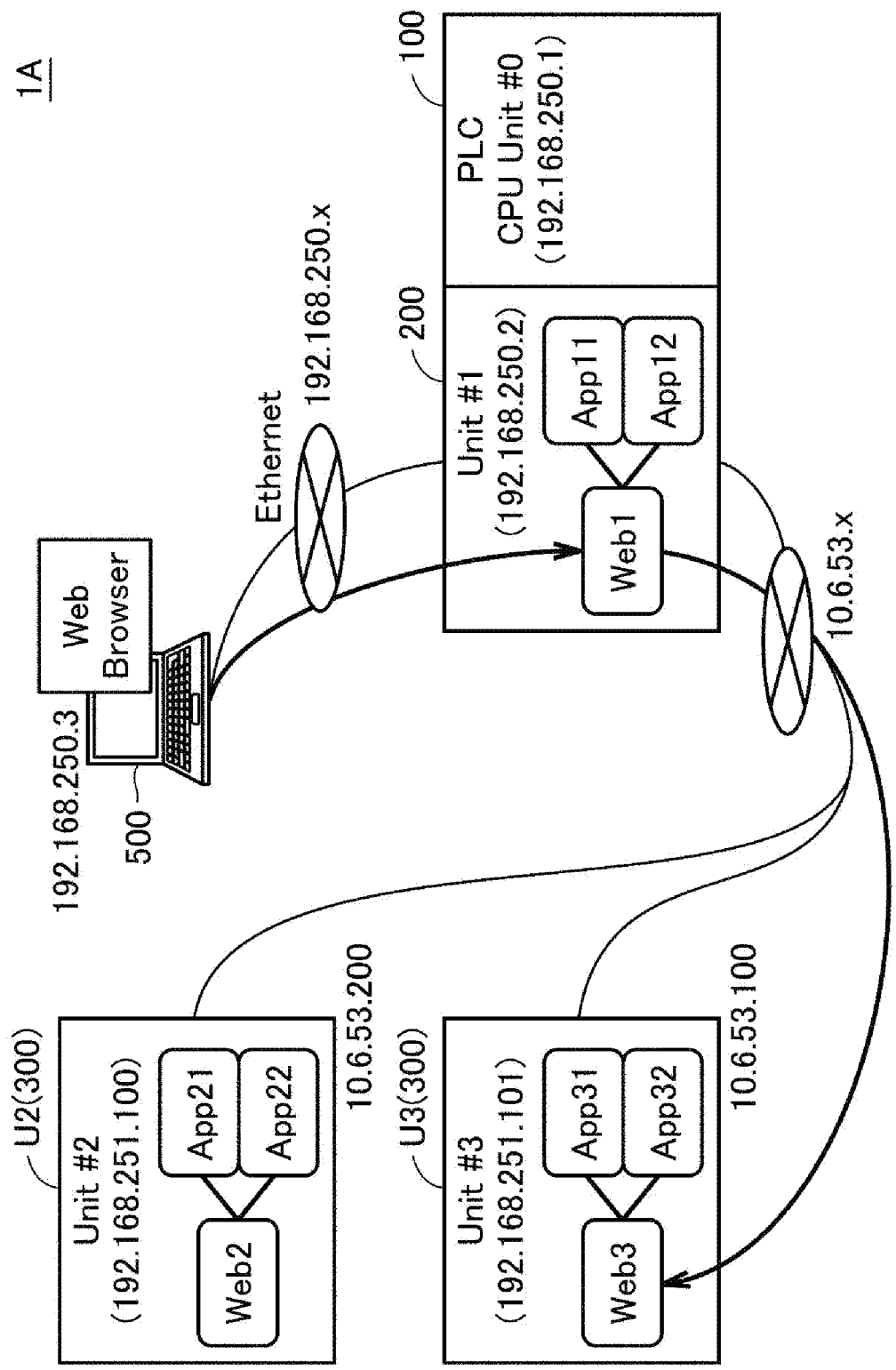
FIG. 24 is a view illustrating a unit constitution of an information processing system according to a modification example.

FIG. 24 is a view illustrating a unit constitution of an information processing system 1A according to a modification example. With reference to FIG. 24, a unit constitution of the information processing system 1A according to the modification example will be described.

In FIG. 7 described above, the units constituting the information processing system 1 are connected to each other via the internal bus 10. In contrast, in the information processing system 1A according to the present modification example, each of the units is connected to the internal network NW2 via the communication port. That is, in the present modification example, the units are installed at places which are physically separated from each other. Even such a unit constitution does not deviate from the gist of the present invention.

K. Modification Example 2 of Device Constitution of Information Processing System 1

Figure 25:
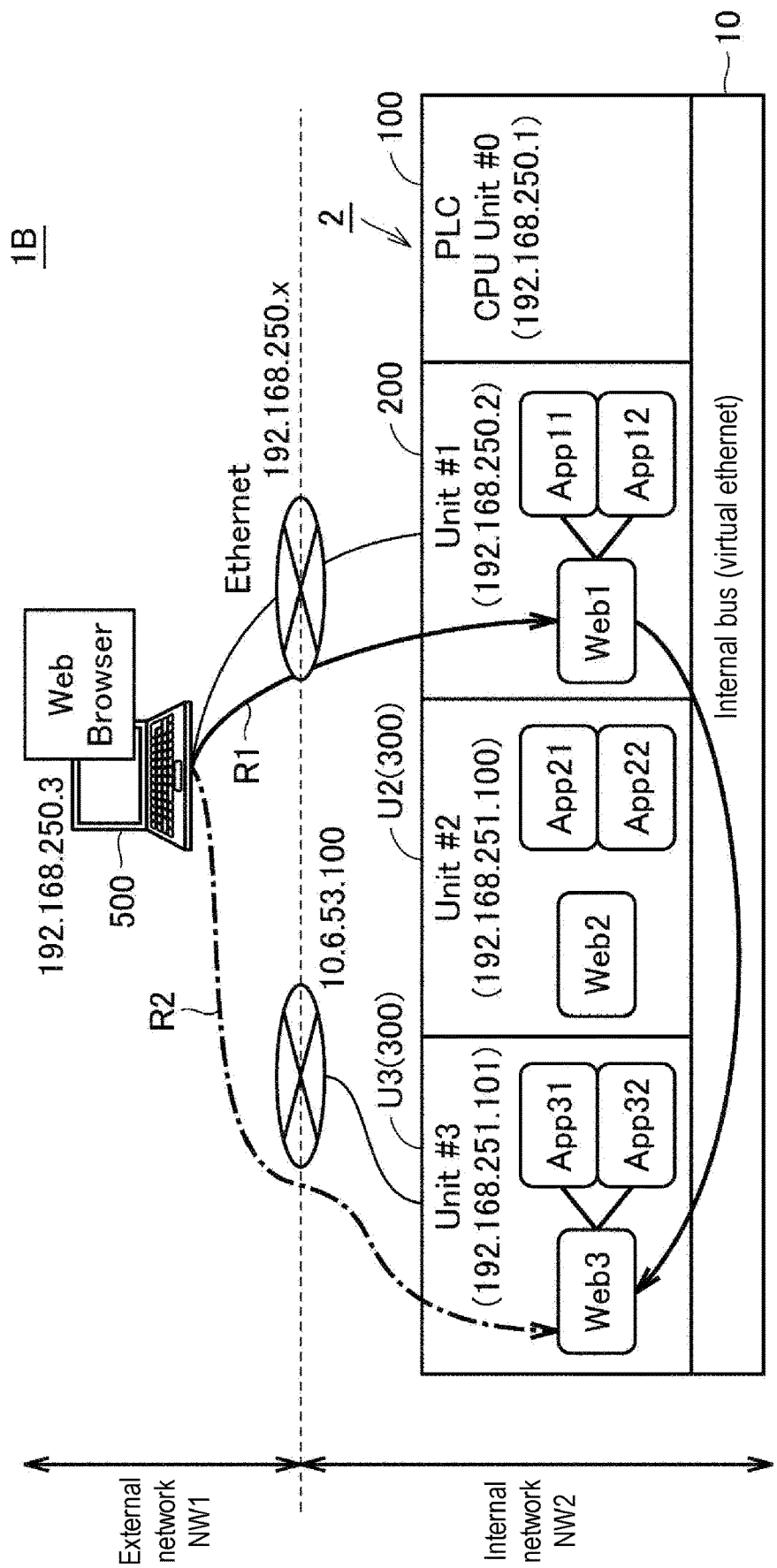
FIG. 25 is a view illustrating a unit constitution of an information processing system according to another modification example.

FIG. 25 is a view illustrating a unit constitution of an information processing system 1B according to a modification example. With reference to FIG. 25, a unit constitution of the information processing system 1B according to the modification example will be described.

In the information processing system 1 illustrated in FIG. 7 described above, only the functional unit 200 is connected to the external network NW1. In contrast, in the information processing system 1B according to the present modification example, not only the functional unit 200 but also other units are connected to the external network NW1. That is, in the present modification example, not only the functional unit 200 but other functional units can also directly communicate with the external device 500. Even such a unit constitution does not deviate from the gist of the present invention.

In the example of FIG. 25, not only the functional unit 200 is directly connected to the external device 500 but also the functional unit U3 is directly connected to the external device 500. That is, regarding communication paths from the external device 500 to the functional unit U3, a communication path R1 which goes through the functional unit 200 and a communication path R2 which does not go through the functional unit 200 are present.

Since such a plurality of communication paths is present, permission and prohibition of access to each application switch therebetween in accordance with the communication path. As an example, regarding the application "App31" of the functional unit U3, communication through the communication path R2 is prohibited and only communication through the communication path R1 is permitted. On the other hand, regarding the application "App32" of the functional unit U3, communication through the communication path R1 is prohibited and only communication through the communication path R2 is permitted.

More specifically, regarding definition of permission and prohibition of access, permission and prohibition of access are defined in advance for each communication path and each application and are retained in each functional unit 300 as definition of permission and prohibition. When a request for access is received from the functional unit 200 or the external device 500, the functional unit 300 identifies an access origin from the URL included in the request for access and identifies the communication path on the basis of the access origin. Thereafter, the functional unit 300 refers to the definition of permission and prohibition and determines for the identified communication path whether or not access to the application at an access destination is permitted.

L. Appendix

As stated above, the present embodiment includes the disclosure as follows.

[Constitution 1]

There is provided a control system (2) which comprises a plurality of units. The plurality of units includes a first unit (200), and a second unit (300, U3) which is able to communicate with the first unit (200). The first unit (200) requests an input of a user account to an external device (500) constituted to be able to communicate with the first unit (200) upon reception of a request for access to the first unit (200) from the external device (500) and transmits the user account to the second unit (300, U3) upon reception of the user account from the external device (500). The second unit (300, U3) refers to registration information defining account information of registered users (330), determines whether or not the user account received by the second unit (300, U3) has been registered, and transmits a token indicating permission of access to the first unit (200) when it is determined that the user account received by the second unit (300, U3) has been registered. The first unit (200) transmits the token received from the second unit (300, U3) to the external device (500).

[Constitution 2]

In the control system according to Constitution 1, the plurality of units further includes a third unit (300, U2). The third unit (300, U2) permits access to the third unit (300, U2) when the token is received from the external device (500) together with a request for access to the third unit (300, U2).

[Constitution 3]

In the control system according to Constitution 2, the third unit (300, U2) is constituted to be able to communicate with the first unit (200). The first unit (200) relays communication between the second unit (300, U3) and the external device (500) and relays communication between the third unit (300, U2) and the external device (500).

[Constitution 4]

In the control system according to any one of Constitutions 1 to 3, an access authority is associated with each user account defined in the account information. The second unit (300, U3) refers to the account information upon reception of the user account from the external device (500), identifies the access authority associated with the user account, and further transmits the identified access authority to the first unit (200) when the token is transmitted to the first unit (200). The first unit (200) transmits information according to the access authority received from the second unit (300, U3) to the external device (500).

[Constitution 5]

In the control system according to Constitution 4, an operation mode of the control system (2) includes a maintenance mode indicating that the control system (2) is under maintenance. The first unit (200) or the second unit (300, U3) rewrites the access authority of a kind set in advance as an access authority of another kind set in advance when the operation mode of the control system (2) is the maintenance mode.

[Constitution 6]

In the control system according to Constitution 5, the first unit (200) or the second unit (300, U3) restores the access authority which has been rewritten as an access authority of another kind set in advance to the access authority before being rewritten when a condition which is set in advance and indicates that maintenance of the control system (2) has ended is satisfied.

[Constitution 7]

There is provided a control method for a control system (2) which comprises a plurality of units. The plurality of units includes a first unit (200), and a second unit (300, U3) which is able to communicate with the first unit (200). The control method includes a step (S36) for the first unit (200) requesting an input of a user account to an external device (500) constituted to be able to communicate with the first unit (200) upon reception of a request for access to the first unit (200) from the external device (500) and transmitting the user account to the second unit (300, U3) upon reception of the user account from the external device (500); a step (S37) for the second unit (300, U3) referring to registration information defining account information of registered users (330), determining whether or not the user account received by the second unit (300, U3) has been registered, and transmitting a token indicating permission of access to the first unit (200) when it is determined that the user account received by the second unit (300, U3) has been registered;

and a step (S38) for the first unit (200) transmitting the token received from the second unit (300, U3) to the external device (500).

It should be considered that the embodiment disclosed this time is an example in all respects and is not restrictive. The scope of the present invention is indicated by the claims rather than the foregoing description, and it is intended to include all the changes within meanings and a range equivalent to the claims.

REFERENCE SIGNS LIST 1, 1A, 1B Information processing system
2 Control system
10, 525 Internal bus
30 Link information
40A, 40B Request for access
100 Control unit
102, 202, 302, 502 Processor
104, 204, 304 Chip set
106, 206, 306, 504 Main storage device
108, 208, 308, 510 Secondary storage device
110, 210 Communication controller
112 USB controller
114, 214, 314 Memory card interface
115, 215, 315 Memory card
116, 118, 120, 216, 218 Network controller
122, 322 Internal bus controller
124, 224, 324 Indicator
150 Communication part
200, 300, 400 Functional unit
212, 511 Communication interface
230 Communication setting information
230A, 230B, 234A, 234B Dashed line
232 Communication control program
234 Account information
236 URL conversion rule
330 Registration information
450 Power supply unit
500, 500A, 500B External device
510A Development support program
514 I/O interface
515 Input device
520 Display interface
521 Display
700 Login page
710 Portal site
710A, 710B Hyperlink
720 Site

The invention claimed is:

1. A control system which comprises a plurality of units,
wherein the plurality of units includes
a first unit, and
a second unit which is able to communicate with the first unit,
wherein the first unit requests an input of a user account to an external device constituted to be able to communicate with the first unit upon reception of a request for access to the first unit from the external device and transmits the user account directly to the second unit upon reception of the user account from the external device,
wherein the second unit refers to registration information defining account information of registered users, determines whether or not the user account received by the second unit has been registered, and transmits a token indicating permission of access directly to the first unit when it is determined that the user account received by the second unit has been registered, and
wherein the first unit transmits the token received from the second unit to the external device,
wherein an access authority is associated with each user account defined in the account information,
wherein the second unit refers to the account information upon reception of the user account from the external device, identifies the access authority associated with the user account, and further transmits the identified access authority to the first unit when the token is transmitted to the first unit, and
wherein the first unit transmits information according to the access authority received from the second unit to the external device,
wherein an operation mode of the control system includes a maintenance mode indicating that the control system is under maintenance, and
wherein the first unit or the second unit rewrites the access authority of a kind set in advance as an access authority of another kind set in advance when the operation mode of the control system is the maintenance mode.

2. The control system according to claim 1,
wherein the plurality of units further includes a third unit, and
wherein the third unit permits access to the third unit when the token is received from the external device together with a request for access to the third unit.

3. The control system according to claim 2,
wherein the third unit is constituted to be able to communicate with the first unit, and
wherein the first unit relays communication between the second unit and the external device and relays communication between the third unit and the external device.

4. The control system according to claim 1,
wherein the first unit or the second unit restores the access authority which has been rewritten as an access authority of another kind set in advance to the access authority before being rewritten when a condition which is set in advance and indicates that maintenance of the control system has ended is satisfied.

5. A control method for a control system which comprises a plurality of units,
wherein the plurality of units includes
a first unit, and
a second unit which is able to communicate with the first unit, and
wherein the control method comprises:
a step of the first unit requesting an input of a user account to an external device constituted to be able to communicate with the first unit upon reception of a request for access to the first unit from the external device and transmitting the user account directly to the second unit upon reception of the user account from the external device;
a step of the second unit referring to registration information defining account information of registered users, determining whether or not the user account received by the second unit has been registered, and transmitting a token indicating permission of access directly to the first unit when it is determined that the user account received by the second unit has been registered; and
a step of the first unit transmitting the token received from the second unit to the external device, wherein an access authority is associated with each user account defined in the account information, wherein the second unit refers to the account information upon reception of the user account from the external device, identifies the access authority associated with the user account, and further transmits the identified access authority to the first unit when the token is transmitted to the first unit, and wherein the first unit transmits information according to the access authority received from the second unit to the external device, wherein an operation mode of the control system includes a maintenance mode indicating that the control system is under maintenance, and wherein the first unit or the second unit rewrites the access authority of a kind set in advance as an access authority of another kind set in advance when the operation mode of the control system is the maintenance mode.

\* \* \* \* \*